United States Patent
Vendelbo

(10) Patent No.: US 12,231,886 B2
(45) Date of Patent: Feb. 18, 2025

(54) HEARING DEVICE WITH CERTIFICATES AND RELATED METHODS

(71) Applicant: GN Hearing A/S, Ballerup (DK)

(72) Inventor: Allan Munk Vendelbo, Ballerup (DK)

(73) Assignee: GN HEARING A/S, Ballerup (DK)

( * ) Notice: Subject to any disclaimer, the term of this patent is extended or adjusted under 35 U.S.C. 154(b) by 265 days.

(21) Appl. No.: 17/835,853

(22) Filed: Jun. 8, 2022

(65) Prior Publication Data

US 2022/0303771 A1    Sep. 22, 2022

Related U.S. Application Data

(63) Continuation of application No. PCT/EP2020/086415, filed on Dec. 16, 2020.

(30) Foreign Application Priority Data

Dec. 19, 2019 (EP) .................................. 19218358

(51) Int. Cl.
| | |
|---|---|
| *H04W 12/069* | (2021.01) |
| *H04R 25/00* | (2006.01) |
| *H04W 84/18* | (2009.01) |

(52) U.S. Cl.
CPC ........ *H04W 12/069* (2021.01); *H04R 25/554* (2013.01); *H04R 25/558* (2013.01);
(Continued)

(58) Field of Classification Search
None
See application file for complete search history.

(56) References Cited

U.S. PATENT DOCUMENTS

| | | | |
|---|---|---|---|
| 2012/0140962 A1* | 6/2012 | Ubezio | H04R 25/558 |
| | | | 381/314 |
| 2017/0004290 A1* | 1/2017 | Pedersen | H04R 25/70 |
| | | (Continued) | |

FOREIGN PATENT DOCUMENTS

| | | |
|---|---|---|
| EP | 2760225 | 7/2014 |
| EP | 3113514 | 1/2017 |

OTHER PUBLICATIONS

PCT International Search Report and Written Opinion for International Appln. No. PCT/EP2020/086415, Applicant GN Hearing A/S, dated Mar. 16, 2021.

(Continued)

*Primary Examiner* — Philip J Chea
*Assistant Examiner* — Bin Qing Zheng
(74) *Attorney, Agent, or Firm* — Vista IP Law Group, LLP

(57) ABSTRACT

A hearing device and a method for operating a hearing device is disclosed, hearing device comprising a processing unit configured to compensate for hearing loss of a user of the hearing device; an interface; and a memory unit, wherein the memory unit has stored therein a first primary certificate comprising a first primary hearing device identifier; a second primary certificate comprising a second primary hearing device identifier; and customer data indicative of the hearing device being configured to operate as a customer hearing device, wherein the processing unit is configured to determine if the hearing device is configured to operate as a customer hearing device based on the customer data; and in accordance with a determination that the hearing device is configured to operate as a customer hearing device, operate the hearing device according to the second primary certificate.

21 Claims, 6 Drawing Sheets

(52) U.S. Cl.
CPC ...... *H04R 2225/55* (2013.01); *H04R 2225/61* (2013.01); *H04W 84/18* (2013.01)

(56) References Cited

U.S. PATENT DOCUMENTS

| | | | |
|---|---|---|---|
| 2017/0006029 A1* | 1/2017 | Pedersen | H04W 12/50 |
| 2017/0318457 A1* | 11/2017 | Westermann | H04L 9/3263 |
| 2018/0160240 A1* | 6/2018 | Pedersen | H04R 25/505 |
| 2018/0227678 A1* | 8/2018 | Pedersen | H04R 25/55 |
| 2019/0335281 A1* | 10/2019 | Dickmann | H04R 25/556 |
| 2022/0303770 A1* | 9/2022 | Vendelbo | H04W 12/71 |
| 2022/0303772 A1* | 9/2022 | Vendelbo | H04L 63/0823 |

OTHER PUBLICATIONS

Extended European Search Report for EP Patent Appln. No 19218358.0 dated May 14, 2020.

* cited by examiner

6
Memory unit

7A
First part

100

HDID_1_1
KEY_SET_1_1
KEY_SET_1_2
KEY_SET_1_3
KEY_SET_1_4
KEY_SET_1_5
HW_ID_1_1
S_1_1

104

CID_2_1
HDID_2_1
KEY_SET_2_1
KEY_SET_2_2
KEY_SET_2_3
S_2_1

108

CID_2_3
C_KEY_2_1
C_KEY_2_2
S_2_3

102

CID_1_2
BLE_ID_1_2
HW_ID_1_2
S_1_2

106

CID_2_2
HW_ID_2_2
MID_2
S_2_2

C_KEY_1_1
C_KEY_1_2
C_KEY_2_3
HW_ID_1
HW_ID_2

7B
Second part

Fig. 3

HEARING DEVICE WITH CERTIFICATES AND RELATED METHODS

RELATED APPLICATION DATA

This application is a continuation of International Patent Application No. PCT/EP2020/086415 filed on Dec. 16, 2020, which claims priority to and the benefit of European Patent Application No. 19218358.0 filed on Dec. 19, 2019. The entire disclosures of the above applications are expressly incorporated by reference herein.

FIELD

The present disclosure relates to a hearing device and related methods including a method of operating a hearing device.

BACKGROUND

Secure communication within a hearing system has gained increased attention in recent years and wireless communication to and from different entities of a hearing system has been increasing in continuation of the developments within wireless communication technology. However, the new technologies entail new challenges for the hearing device manufacturers to secure communication in a hearing system. Wireless communication interfaces of a hearing system desirably use an open standard-based interface. However, this poses many challenges in terms of security.

While securing communication between entities, there is also a desire to allow third parties also denoted OEM customers to control their own hearing devices and/or reuse one or more parts of the manufacturer's security schemes of the security architecture.

SUMMARY

Accordingly, there is a need for hearing devices and methods with improved design flexibility for OEM customer hearing systems, while maintaining high security level in the communication between entities of the OEM customer hearing system.

A hearing device comprising a processing unit optionally configured to compensate for hearing loss of a user of the hearing device; an interface; and a memory unit is disclosed, wherein the memory unit has stored therein a first primary certificate optionally comprising a first primary hearing device identifier; a second primary certificate optionally comprising a second primary hearing device identifier; and customer data indicative of the hearing device being configured to operate as a customer hearing device, wherein the processing unit is configured to determine if the hearing device is configured to operate as a customer hearing device based on the customer data; and, optionally in accordance with a determination that the hearing device is configured to operate as a customer hearing device, operate the hearing device according to the second primary certificate.

Further, a method for operating a hearing device comprising a processing unit optionally configured to compensate for hearing loss of a user of the hearing device; an interface; and a memory unit, wherein the memory unit has stored therein a first primary certificate optionally comprising a first primary hearing device identifier; a second primary certificate optionally comprising a second primary hearing device identifier; and customer data indicative of the hearing device being configured to operate as a customer hearing device is disclosed, the method comprising determining if the hearing device is configured to operate as a customer hearing device based on customer data; and, optionally in accordance with a determination that the hearing device is configured to operate as a customer hearing device, operating the hearing device according to the second primary certificate.

It is an advantage of the present disclosure that the hearing device manufacturer can remain in full control of which hearing devices are to be considered customer hearing devices, i.e. which hearing devices are sold/used as OEM devices and the security functionality of such customer hearing devices. Further, separate and different secret keys can be used for different OEM customers.

Advantageously, the present disclosure allows the OEM customer to remain in full control of the model of the customer hearing device.

Even further, the present disclosure enables that the OEM customer can do fitting and Remote Fine Tuning to their customer hearing devices also denoted OEM devices.

Also, the OEM may be enabled to implement and run their own OS version if requested.

In general, the present disclosure provides a high degree of security in the hearing device communication while allowing a high degree of flexibility in the control of access to the hearing device.

Advantageously, the present disclosure reduces or removes the requirement for building customized firmware for third parties due to the security architecture.

The method and apparatus as disclosed provides a scalable security architecture for manufacturing a hearing device with improved security. The hearing device disclosed herein advantageously verifies integrity of received data, detecting any alteration and disregard altered data for e.g. maintenance, fitting session, and/or remote tuning. The disclosed hearing devices and methods for operating the hearing device supports a hearing device in combatting attacks such as unauthorized access or control of a hearing device, while still allowing access to legitimate parties such as the hearing device manufacturer and an OEM customer, for e.g. fitting purposes, update purposes, maintenance purposes. Further, time-consuming and tedious rebuild and reverification of firmware can be reduced or eliminated.

BRIEF DESCRIPTION OF THE DRAWINGS

The above and other features and advantages will become readily apparent to those skilled in the art by the following detailed description of exemplary embodiments thereof with reference to the attached drawings, in which:

FIG. 3 shows exemplary certificates stored in memory of a hearing device.

DETAILED DESCRIPTION

Figure 1:
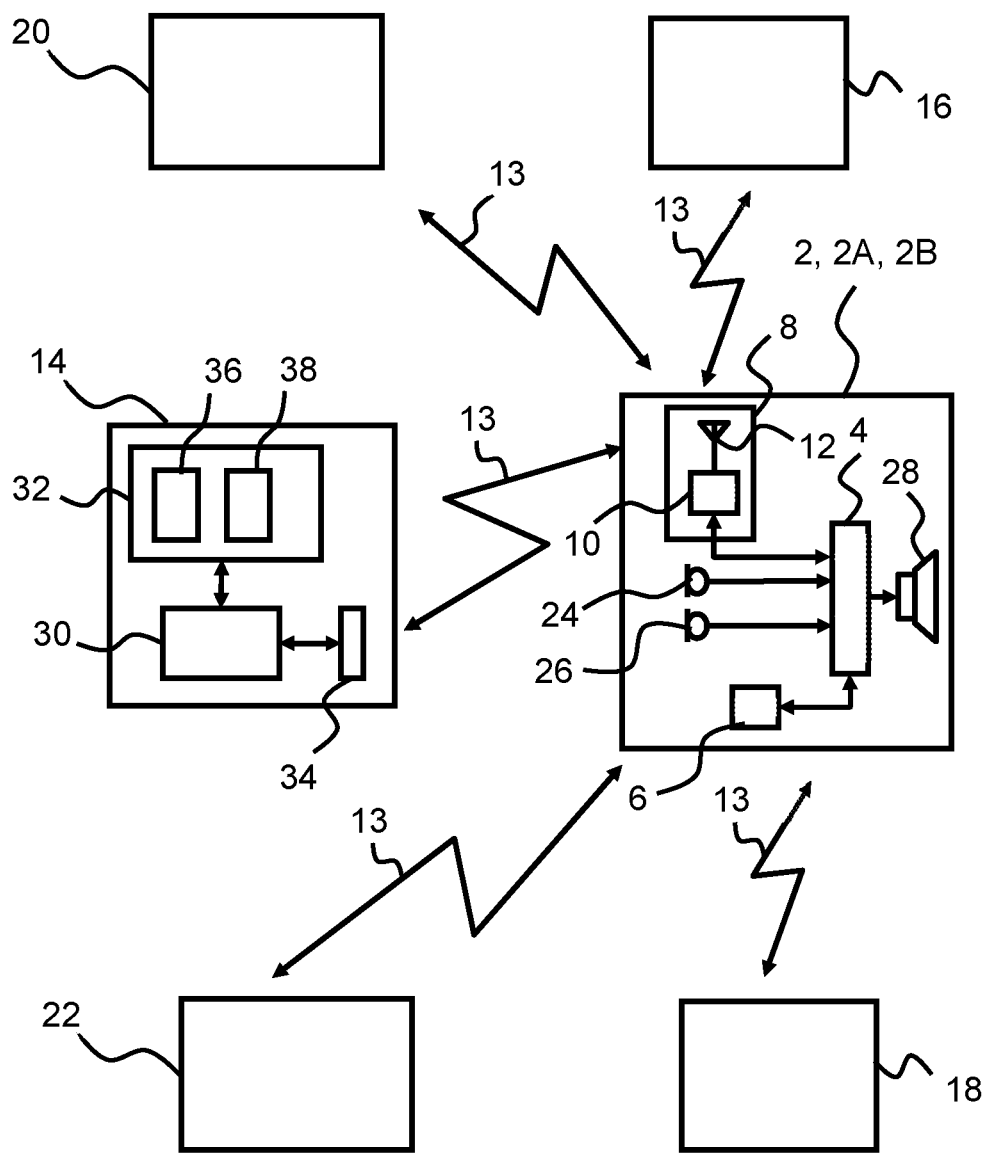
FIG. 1 shows an schematically illustrates an exemplary architecture of a hearing system according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

It is an object of the present disclosure is to provide hearing device(s), and method(s) which seeks to mitigate, alleviate, or eliminate one or more of the above-identified deficiencies in the art and disadvantages singly or in any combination.

The present disclosure relates to improved security of a hearing device and/or improved security in communication between a hearing device and entities of a hearing system. Security comprise in assessing threats, vulnerabilities and attacks and developing appropriate safeguards and countermeasures to protect against threats and attacks. The present disclosure relates to a hearing device comprising a processing unit optionally configured to compensate for hearing loss of a user of the hearing device.

A hearing device is disclosed. The hearing device comprises a processing unit optionally configured to compensate for hearing loss of a user of the hearing device; an interface; and a memory unit.

The hearing device may be a hearable. The hearing device may be a hearing aid.

The hearing device may be of the behind-the-ear (BTE) type, in-the-ear (ITE) type, in-the-canal (ITC) type, receiver-in-canal (RIC) type or receiver-in-the-ear (RITE) type. The hearing aid may be a binaural hearing aid.

The hearing device may be configured for wireless communication, e.g. via the interface, with one or more devices, such as with another hearing device, e.g. as part of a binaural hearing system, and/or with one or more accessory devices, such as a smartphone and/or a smart watch. The interface may comprise a wireless transceiver, e.g. configured for wireless communication at frequencies in the range from 2.4 to 2.5 GHz.

The interface of the hearing device optionally comprises one or more antennas for converting one or more wireless input signals, e.g. a first wireless input signal and/or a second wireless input signal, to antenna output signal(s). The wireless input signal(s) may origin from external source(s), such as spouse microphone device(s), wireless TV audio transmitter, and/or a distributed microphone array associated with a wireless transmitter. The wireless input signal(s) may origin from another hearing device, e.g. as part of a binaural hearing system, and/or from one or more accessory devices, such as a smartphone, tablet device, and/or a smartwatch.

The interface of the hearing device optionally comprises a radio transceiver coupled to the antenna(s) for converting the antenna output signal(s) to a transceiver input signal. Wireless signals from different external sources may be multiplexed in the radio transceiver to a transceiver input signal or provided as separate transceiver input signals on separate transceiver output terminals of the radio transceiver. The transceiver input signal optionally comprises a first transceiver input signal representative of the first wireless signal from a first external source.

The hearing device optionally comprises a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal.

The hearing device optionally comprises a pre-processing unit. The pre-processing unit may be connected to the radio transceiver for pre-processing the transceiver input signal. The pre-processing unit may be connected to the first microphone for pre-processing the first microphone input signal. The pre-processing unit may be connected the second microphone if present for pre-processing the second microphone input signal. The pre-processing unit may comprise one or more ND-converters for converting analog microphone input signal(s) to digital pre-processed microphone input signal(s).

The hearing device comprises a processing unit for processing input signals, such as microphone input signal(s), transceiver input signal, pre-processed transceiver input signal and/or pre-processed microphone input signal(s). The processing unit provides an electrical output signal based on the input signals to the processing unit. Input terminal(s) of the processing unit are optionally connected to respective output terminals of the pre-processing unit. For example, a transceiver input terminal of the processor may be connected to a transceiver output terminal of the pre-processing unit. One or more microphone input terminals of the processor may be connected to respective one or more microphone output terminals of the pre-processing unit.

The hearing device comprises a memory unit. The memory unit may include removable and non-removable data storage units including, but not limited to, Read Only Memory (ROM), Random Access Memory (RAM), etc. The memory unit may be separated in a plurality of memory parts, such as two, three or more memory parts. The memory unit may comprise a first memory part. The first memory part may be a writable memory part. The memory unit may comprise a second memory part. The second memory part may be a locked or protected memory part, such as a non-writable memory part. The memory unit may have a certificate stored at a memory address of the memory unit, and/or in memory cells of the memory unit, such as in designated memory cells and/or at designated addresses.

A hearing device comprising a memory unit having one or more certificates, such as one or more first certificates and/or one or more second certificates, stored therein is disclosed. The first certificate(s) may be used for communication with one or more first entities, such as a first server device, a first client/fitting device, and/or an accessory device with a first user application installed thereon. The second certificate(s) may be used for communication with one or more second entities also denoted third-party entities, such as a second server device, a second client/fitting device, and/or an accessory device with a second user application installed thereon. Having first and second certificates stored in the memory unit allows a hearing device manufacturer to operate hearing devices in a first domain, e.g. under the manufacturers control using first certificates (for communication with first entities) and to sell hearing devices (OEM hearing devices) to a third party or OEM customer. Having first and second certificates stored in the memory unit allows a third party (OEM customer) to operate hearing devices in a second domain, e.g. under the third party's control using second certificates (for communication with second entities). Thus, the third party can control and/or operate the customer hearing devices (OEM hearing devices) using the second certificate(s) and/or first certificates depending on the desired functionalities and control of the customer hearing device. Operating the hearing device in the first domain relies on a first security architecture, e.g. at least partly defined by or based on first certificate(s). Operating the hearing device in the second domain relies on a second security architecture. The second security architecture is optionally defined by or based on second certificate(s) and/or first certificates. In other words, the first domain may depend on first certificates and be independent on second certificates, while the second domain may depend on first certificate(s) and second certificate(s).

In the present disclosure, the term "certificate" refers to a data structure that enables verification of its origin and content, such as verifying the legitimacy and/or authenticity of its origin and content. The certificate is configured to provide a content that is associated to a holder of the certificate by an issuer of the certificate. The certificate optionally comprises keying material, such as one or more keys, and/or a signature, so that a recipient of the certificate is able to verify or authenticate the certificate content and origin. The certificate permits thus to achieve authentication of origin and content, non-repudiation, and/or integrity protection. The certificate may further comprise a validity period, one or more algorithm parameters, and/or an issuer. A certificate may comprise a digital certificate, a public key certificate, an attribute certificate, and/or an authorization certificate. Examples of certificates are X.509 certificates, and Secure/Multipurpose Internet Mail Extensions, S/MIME, certificates, and/or Transport Layer Security, TLS, certificates.

A certificate may comprise a certificate type identifier. The certificate type identifier may indicate a type of the certificate amongst a variety of certificate types. The certificate type identifier may be used by the hearing device to identify what type of certificate the hearing device receives, stores, authenticates and/or retrieves. A certificate may comprise a version identifier indicative of a data format version of the certificate. The hearing device may use the certificate type identifier and/or the version identifier to determine what type of data the certificate comprises and/or what type of data is comprised in a field of the certificate. For example, the hearing device may determine based on the certificate type identifier and/or version identifier what field of the certificate comprises a digital signature and/or which public key is needed to verify the digital signature of the certificate. It may be envisaged that there is a one-to-one mapping between the certificate type identifier and the public-private key pair.

A certificate may comprise a signing device identifier. The signing device identifier refers to a unique identifier identifying the device that has signed the certificate, such as a manufacturing device, e.g. an integrated circuit card, a smart card, a hardware security module. The signing device identifier may for example comprise a medium access control, MAC, address of the signing device and/or a serial number of the signing device. The signing device identifier may allow for example the hearing device to determine whether the signing device is e.g. black-listed or not, and thus to reject certificates signed by a signing device that has been black-listed, e.g. due to theft or other corruption.

A certificate may comprise one or more hardware identifiers. A hardware identifier may identify a piece of hardware comprised in the hearing device, such as a radio chip comprised in the hearing device and/or a digital signal processor (processing unit) of the hearing device. The hardware identifier(s) may be stored in a register (regarded as comprised in second memory part of memory unit) of the piece of hardware comprised in the hearing device during manufacturing of the piece of hardware. The hardware identifier may comprise a serial number of the hardware, a chip identifier, or any combination thereof. The hearing device receiving or retrieving from the memory unit a certificate comprising the hardware identifier may verify the certificate by comparing the stored hardware identifier and the corresponding hardware identifier comprised in the certificate. Such verification may be performed upon reception of the certificate, and/or upon retrieval of the certificate from the memory unit, such as at boot or power-on of the hearing device.

A certificate may comprise one or more client device type authorization identifiers. A client device type may comprise a model, category or type of client devices, such as a tablet product model, category or type, a USB dongle product model, category or type. A client device type authorization identifier is an identifier of an authorized client device type, such as an identifier of the client device types that the hearing device may authorize or accept for communication, such as for fitting. For example, the client device type authorization identifier is in one or more hearing devices a bit-field indicative of the type(s) of client device the hearing device should allow for fitting.

A certificate may comprise a token parameter. The token parameter may indicate whether a token-based authentication between the hearing device and a client device is to be enabled or not. For example, if the token parameter is set to 0, token-based authentication of client devices is not to be enabled by the hearing device and the hearing device is to use for example a combination of client device type identifier and/or a client device identifier (such as a serial number) to perform an authentication of the client device. If for example the token parameter is set to 1, token-based authentication of client devices is to be enabled by the hearing device, i.e. the hearing device authenticates the client device based on a token received from the client device. The hearing device may also derive a session-specific token based on the received token parameter which is used to e.g. accept the connection to the client device without user intervention.

A certificate may comprise one or more of a hardware platform identifier, a software platform identifier, and/or a certificate timestamp. The hardware platform identifier may identify a hardware platform, such as an operational hearing device hardware platform, i.e. a hardware platform compatible with the hearing device certificate. The software platform identifier may identify one or a family of software platforms on which the certificate is configured to operate. The certificate timestamp refers to a timestamp of production or manufacture of the certificate, such as a timestamp of the manufacturing device indicating a time instant when the certificate is generated. The certificate timestamp may be in form of e.g.: hour, min, date, month, year. The hearing device may subsequently perform version control and revocation using the hardware platform identifier, the software platform identifier, and/or the certificate timestamp.

A certificate may comprise a signature also denoted digital signature. The digital signature enables a proof or verification of authenticity of the certificate, such as verification of the signer legitimacy. The hearing device may be configured to verify digital signature(s) when determining if the certificate comprising the digital signature is valid, e.g. at startup or booting of the hearing device and/or when receiving the certificate. A digital signature of a certificate is verifiable by the hearing device e.g. using a corresponding public key, e.g. stored in another certificate and/or in a locked part of the memory unit. If the digital signature is not successfully verified using the alleged public key, the hearing device may disregard the certificate and/or forgo/abort normal operation of the hearing device or operation according to one or more certificates. This may provide the advantage that the hearing device rejects a certificate that is tampered or received from unauthenticated parties. The communication with the hearing device may thus be robust against impersonation, modification and masquerading attacks and/or misuse of a hearing device. In the present disclosure, to abort/aborting normal operation of the hearing device may comprise one or more of to enter a service mode, a repair mode, or a reboot mode. To abort/aborting normal operation of the hearing device may comprise forgo compensating for hearing loss of the user and/or switch the hearing device off. To abort/aborting normal operation of the hearing device may comprise to enter a software update mode.

The present disclosure provides a hearing device, wherein the memory unit may have stored therein a first primary certificate optionally comprising a first primary hearing device identifier. The memory unit may have stored therein a second primary certificate optionally comprising a second primary hearing device identifier.

Further, the memory unit optionally has stored therein customer data indicative of the hearing device being configured to operate as a customer hearing device. In the present context, a customer hearing device is a hearing device at least partly controlled and sold to a user by a third party (OEM customer), i.e. the manufacturer of the hearing device is an original equipment manufacturer (OEM) that has sold the hearing device to a third party selling the hearing device under the third party's own brand.

The processing unit is optionally configured to determine if the hearing device is configured to operate as a customer hearing device based on the customer data. The hearing device may be configured to operate as a customer hearing device if customer data are present and/or if customer data of a certificate, such as customer data of first secondary certificate, corresponds to customer data of one or more other certificates, such as one or more of second primary certificate, second secondary certificate, and second tertiary certificate.

The processing unit may be configured to, optionally in accordance with a determination that the hearing device is configured to operate as a customer hearing device, operate the hearing device according to one or more second certificates, such as the second primary certificate and/or a second secondary certificate. In other words, the processing unit may, when the hearing device is configured as a customer hearing device, be configured to operate the hearing device according to the second primary certificate.

In one or more exemplary hearing devices and/or methods, the first primary certificate is different from the second primary certificate. For example, a first primary keyset of the first primary certificate may be different from a second primary keyset of the second primary certificate and/or a first secondary keyset of the first primary certificate may be different from a second secondary keyset of the second primary certificate.

In one or more exemplary hearing devices, the processing unit is configured to, in accordance with a determination that the hearing device is not configured to operate as a customer hearing device, operate the hearing device according to the first primary certificate and/or forgo to operate the hearing device according to the second primary certificate.

In one or more exemplary hearing devices/methods, the memory unit has stored therein a first secondary certificate comprising first secondary customer data, such as a first secondary customer identifier and/or a first secondary BLE identifier. The processing unit is optionally configured to determine if the hearing device is configured to operate as a customer hearing device based on the first secondary customer data. In other words, to determine if the hearing device is configured to operate as a customer hearing device based on the customer data may comprise to determine if the hearing device is configured to operate as a customer hearing device based on the first secondary customer data.

In one or more exemplary hearing devices, the customer data comprises one or more BLE identifiers, such as a first secondary BLE identifier, and/or one or more customer identifiers indicative of a customer. A BLE identifier is the Bluetooth address of the hearing device. The one or more customer identifiers of the customer data may comprise one or more, such as all, of a first secondary customer identifier, a second primary customer identifier, a second secondary customer identifier, and a second tertiary customer identifier. A customer identifier may comprise a first value and optionally a second value.

In one or more exemplary hearing devices, to determine if the hearing device is configured to operate as a customer hearing device based on the customer data comprises determining if the second primary certificate is valid, and wherein the processing unit is configured to, in accordance with a determination that the second primary certificate is not valid, forgo to operate the hearing device according to the second primary certificate. In one or more exemplary hearing devices, forgo to operate the hearing device according to the second primary certificate may comprise aborting normal hearing device operation or putting the hearing device in a repair mode or service mode.

In one or more exemplary hearing devices, determining if the second primary certificate is valid comprises verifying a second primary signature of the second primary certificate, and wherein the second primary certificate is not valid if the second primary signature of the second primary certificate is not verified. The second primary certificate may be verified using a second primary certificate key, e.g. stored in second secondary certificate or second tertiary certificate.

By having the second primary certificate key and/or a second secondary certificate key stored in second tertiary certificate, support of several different OEM customers with the same hardware is provided for, since second certificate keys (which are used for verifying second certificates/signatures) are not stored in the locked part of the memory unit. Further, a possibility of adding a certificate key generated by the third party/OEM customer is thereby provided for, which in turn increases flexibility in manufacture and freedom for the third party to create and use their own certificate keys. Further, the need for defining certificate keys very early in the manufacture of the hearing device is reduced.

In one or more exemplary hearing devices, determining if the second primary certificate is valid comprises comparing the first primary hearing device identifier and the second primary hearing device identifier. In one or more exemplary hearing devices, the second primary certificate is not valid if the first primary hearing device identifier is different from the second primary hearing device identifier.

In one or more exemplary hearing devices, the second primary certificate comprises a second primary customer identifier. In one or more exemplary hearing devices, determining if the second primary certificate is valid comprises comparing the second primary customer identifier with (other) customer identifier(s) of the customer data, such as one or more, e.g. all, of first secondary customer identifier, second secondary customer identifier, and second tertiary customer identifier. In one or more exemplary hearing devices, the second primary certificate is not valid if the second primary customer identifier is different from a customer identifier of the customer data.

In one or more exemplary hearing devices, to determine if the hearing device is configured to operate as a customer hearing device based on the customer data comprises determining if the second secondary certificate is valid, and wherein the processing unit is configured to, in accordance with a determination that the second secondary certificate is not valid, forgo to operate the hearing device according to the second primary certificate. In one or more exemplary hearing devices, forgo to operate the hearing device according to the second primary certificate may comprise aborting normal hearing device operation or putting the hearing device in a repair mode or service mode.

In one or more exemplary hearing devices, determining if the second secondary certificate is valid comprises verifying a second secondary signature of the second secondary certificate, and wherein the second secondary certificate is not valid if the second secondary signature of the second secondary certificate is not verified. The second secondary certificate may be verified using a second secondary certificate key, e.g. stored in second primary certificate or second tertiary certificate.

In one or more exemplary hearing devices, the second secondary certificate comprises a second secondary customer identifier. In one or more exemplary hearing devices, determining if the second secondary certificate is valid comprises comparing the second secondary customer identifier with customer identifier(s) of the customer data, such as one or more, e.g. all, of first secondary customer identifier, second primary customer identifier, and second tertiary customer identifier. In one or more exemplary hearing devices, the second secondary certificate is not valid if the second secondary customer identifier is different from a customer identifier of the customer data.

In one or more exemplary hearing devices, the second secondary certificate comprises a second secondary hardware identifier. In one or more exemplary hearing devices, determining if the second secondary certificate is valid comprises comparing the second secondary hardware identifier with first hardware identifier stored in the second part of the memory. In one or more exemplary hearing devices, the second secondary certificate is not valid if the second secondary hardware identifier is different from the first hardware identifier.

In one or more exemplary hearing devices, to determine if the hearing device is configured to operate as a customer hearing device based on the customer data comprises determining if the second tertiary certificate is valid, and wherein the processing unit is configured to, in accordance with a determination that the second tertiary certificate is not valid, forgo to operate the hearing device according to the second primary certificate.

In one or more exemplary hearing devices, determining if the second tertiary certificate is valid comprises verifying a second tertiary signature of the second tertiary certificate, and wherein the second tertiary certificate is not valid if the second tertiary signature of the second tertiary certificate is not verified. The second tertiary certificate may be verified using a second tertiary certificate key, e.g. stored in the second part of the memory unit.

In one or more exemplary hearing devices, the second tertiary certificate key is optionally stored in the first secondary certificate.

In one or more exemplary hearing devices, the second tertiary certificate comprises a second tertiary customer identifier. In one or more exemplary hearing devices, determining if the second tertiary certificate is valid comprises comparing the second tertiary customer identifier with customer identifier(s) of the customer data, such as one or more, e.g. all, of first secondary customer identifier, second primary customer identifier, and second secondary customer identifier. In one or more exemplary hearing devices, the second tertiary certificate is not valid if the second tertiary customer identifier is different from a customer identifier of the customer data, such as different from one of more of first secondary customer identifier, second primary customer identifier, and second secondary customer identifier.

In one or more exemplary hearing devices, determining if certificates are valid only comprises determining if signatures are valid. However, determining if a certificate is valid may comprise further validation steps as described herein, such as verifying or comparing identifiers of the certificate with identifiers with other certificates or stored in the second part of the hearing device.

In one or more exemplary hearing devices, the second primary certificate comprises one or more second keysets optionally including a second primary keyset comprising one or more second primary keys and optionally a second primary key identifier. In one or more exemplary hearing devices, to operate the hearing device according to the second primary certificate comprises setting up a connection to an accessory device or a second user application installed on an accessory device based on a second primary key of the second primary keyset.

In one or more exemplary hearing devices, setting up a connection to an accessory device comprises obtaining a session key. In one or more exemplary hearing devices, setting up a connection to an accessory device comprises encrypting the session key with the second primary key of the second primary keyset to obtain an encrypted session key. In one or more exemplary hearing devices, setting up a connection to an accessory device comprises transmitting the encrypted session key to the accessory device.

The processing unit is optionally configured to determine if the hearing device is configured to operate as a manufacturer hearing device based on the first second certificate, such as based on customer data and/or one or more identifiers of the first secondary certificate; and in accordance with a determination that the hearing device is configured to operate as a manufacturer hearing device, operate the hearing device according to the first primary certificate.

Further, the present disclosure provides a hearing device, wherein the memory unit has stored therein a first primary customer device identifier, and a first model certificate comprising a first customer identifier, and second model data comprising a second model customer identifier and optionally second model information data indicative of one or more available models for the hearing device.

In the present disclosure, the first primary customer device identifier may also be referred to as the first hardware identifier optionally stored in the second part of the memory unit.

In the present disclosure, the first model certificate may also be referred to as the first secondary certificate. The first customer identifier may also be referred to as the first secondary customer identifier.

The second model data may be stored or at least partly stored in the second secondary certificate. In other words, the second secondary certificate may be referred to as a second model certificate. The second model data optionally comprises a second model customer identifier, such as the second secondary customer identifier of the second secondary certificate. In other words, the second secondary customer identifier may be referred to as a second model customer identifier. The second model data optionally comprises second model information data MID_2 indicative of one or more available models for the hearing device, e.g. such as indicative of one or more available models for the hearing device when the hearing device is configured as a customer hearing device. Use of a second secondary customer identifier may ensure that the second secondary certificate can only be used by an assigned third party or OEM customer. Second certificates may all have a customer identifier stored thereon facilitating identification of the certificates from the manufacturer perspective and/or enabling more effective debugging.

In one or more exemplary hearing devices, the processing unit is configured to verify the second model data. The processing unit is configured to upon successful verification of the second model data, operate the hearing device according to the second model information data. Thereby, an OEM customer may be allowed to define and control the operability of the hearing device. In other words, an OEM customer may be allowed to define and control which models the hearing device can be configured to operate as, i.e. assign specific functionality to a customer hearing device.

In one or more exemplary hearing devices, to verify the second model data comprises to obtain a current model identifier, e.g. from the memory unit, such as from a first certificate, and to compare the current model identifier with the second model information data, MID_2. In one or more exemplary hearing devices, the verification of the second model data is successful when the current model identifier satisfies a model criterion based on the second model information data. For example, the current model identifier may satisfy the model criterion if the current model identifier corresponds to, matches, or is the same as a second model identifier of the second model information data, or if the current model identifier corresponds to, matches, or is the same as a second model of a set of available hearing device models as defined by the second model information data.

In one or more exemplary hearing devices, to verify the second model data comprises to determine if the second model customer identifier corresponds to the first (secondary) customer identifier. In one or more exemplary hearing devices, the verification of the second model data is successful or at least partly successful when the second model customer identifier corresponds to, matches, or is the same as the first (secondary) customer identifier.

In one or more exemplary hearing devices, the memory unit has stored therein a second model certificate, also denoted second secondary certificate, comprising the second model data and a second secondary signature. In one or more exemplary hearing devices, to verify the second model data comprises to verify the second secondary signature, e.g. using a second model public key also denoted second secondary certificate key. In one or more exemplary hearing devices, the verification of the second model data is successful when the verification of the second secondary signature is successful. In other words, the verification of the second model data may be successful when the second secondary certificate is valid.

In one or more example hearing devices, to verify the second model data may comprise a combination of one or more of verifying if the current model identifier satisfies a model criterion, determining if the second model customer identifier corresponds to the first customer identifier, and verifying the second secondary signature/the second secondary certificate.

In one or more exemplary hearing devices, the second model data comprising a second customer device identifier. The second secondary hardware identifier, HW_ID_2_2 may be used as the second customer device identifier. In one or more exemplary hearing devices, to verify the second model data comprises to determine if the second customer device identifier corresponds to, matches, or is the same as the first primary customer device identifier, e.g. first secondary hardware identifier HW_1_2, and/or if the second customer device identifier corresponds to, matches, or is the same as the first hardware identifier of the second part of the memory unit. In one or more exemplary hearing devices, the verification of the second model data is successful when the second customer device identifier, e.g. second secondary hardware identifier, corresponds to, matches, or is the same as the first primary customer device identifier.

In one or more exemplary hearing devices/methods, the first primary customer device identifier is based on a hardware identifier of the hearing device. For example, the first primary hardware identifier may be the first primary customer device identifier In one or more exemplary hearing devices/methods, the hearing device is configured to operate as a customer hearing device based on the first customer identifier.

In one or more exemplary hearing devices/methods, the memory unit has stored therein a first key certificate comprising a first model key. The first secondary certificate key may be used as the first model key. Thus, the first secondary certificate key may be referred to as the first model key. In other words, the first model key may be stored in the second part of the memory unit, not necessarily as part of a certificate. The hearing device may be configured to verify the first model certificate with the first model key and wherein to operate the hearing device according to the second model information data is conditioned on a successful verification of the first model certificate.

In one or more exemplary hearing devices/methods, the memory unit has stored therein a second key certificate comprising a second model key. The second secondary certificate key may be used as the second model key. Thus, the second secondary certificate key may be referred to as the second model key. In other words, the second model key may be comprised in the second tertiary certificate, the second tertiary certificate thus being the second key certificate. The hearing device may be configured to verify the second model certificate with the second model key and wherein to operate the hearing device according to the second model information data is conditioned on a successful verification of the second model certificate.

In one or more exemplary hearing devices/methods, the second key certificate comprises a second tertiary customer identifier. In one or more exemplary hearing devices, to verify the second model data comprises to determine if the second model customer identifier corresponds to, matches, or is the same as the second tertiary customer identifier. In one or more exemplary hearing devices, the verification of the second model data is successful or at least partly successful when the second model customer identifier corresponds to, matches, or is the same as the second tertiary customer identifier.

The present disclosure provides a hearing device, wherein the memory unit has stored therein a first primary certificate optionally comprising a first primary hearing device identifier. The memory unit has stored therein a second primary certificate optionally comprising a second primary hearing device identifier and second key data for third-party control of the hearing device. The second key data optionally comprises one or more second keysets including a second primary keyset. The processing unit is configured to verify the second primary certificate, e.g. based on the first primary hearing device identifier and the second primary hearing device identifier and/or based on a second primary signature of the second primary certificate. The processing unit is optionally configured to, in accordance with a successful verification of the second primary certificate, communicate with a third-party entity, such as one or more second entities, based on the second key data.

In one or more exemplary hearing devices, the second primary keyset is a fitting device keyset configured to secure communication with a fitting device being the third-party entity. Thus, the second primary keyset may be used for communication with a second client/tablet/fitting/dispenser device and/or a fitting application installed and running on the second tablet/fitting/dispenser device, such as a tablet, a portable computer, or a stationary computer, wherein the tablet/fitting/dispenser device and/or a fitting application is optionally controlled by the OEM customer or third party.

In one or more exemplary hearing devices, the one or more second key sets include a second secondary keyset.

In one or more exemplary hearing devices, the second secondary keyset is a third-party server keyset configured to secure communication with a third-party server, also denoted second server device, being the third-party entity. Thus, the second secondary keyset may be used for communication with a second server device (third-party server), e.g. controlled by the OEM customer/third party. In other words, the second secondary keyset may be an OEM server/cloud keyset also denoted a third-party server keyset, e.g. configured to secure communication with a third-party server being the third-party entity.

In one or more exemplary hearing devices, to verify the second primary certificate comprises to verify the second primary hearing device identifier, e.g. based on the first primary hearing device identifier, such as by comparing the second hearing device identifier with the first primary hearing device identifier.

In one or more exemplary hearing devices, the memory has stored therein a second primary certificate key. In one or more exemplary hearing devices, to verify the second primary certificate comprises to verify a second primary signature of the second primary certificate based on the second primary certificate key.

In one or more exemplary hearing devices, to communicate with a third-party entity based on the second key data comprises to verify communication data based on the second primary keyset.

In one or more exemplary hearing devices, to communicate with a third-party entity based on the second key data, such as based on the second primary keyset, comprises to receive and store one or more hearing device parameters such as one or more of gain settings, program settings, filter coefficients, or other hearing device settings, from a second client/tablet/fitting/dispenser device. In other words, the third party or OEM customer may be allowed to implement and run an own fitting device for fitting the hearing device.

In one or more exemplary hearing devices, to communicate with a third-party entity based on the second key data comprises to verify communication data based on the second secondary keyset.

In one or more exemplary hearing devices, to communicate with a third-party entity based on the second key data, such as based on the second secondary keyset, comprises to apply a third-party operating system in the processing unit. To apply a third-party operating system in the processing unit comprises one or more of to run, deploy, install, operate according to, and store in memory unit. In other words, the third party or OEM customer may be allowed to implement and run an own operating system on the hearing device.

Figure 2:
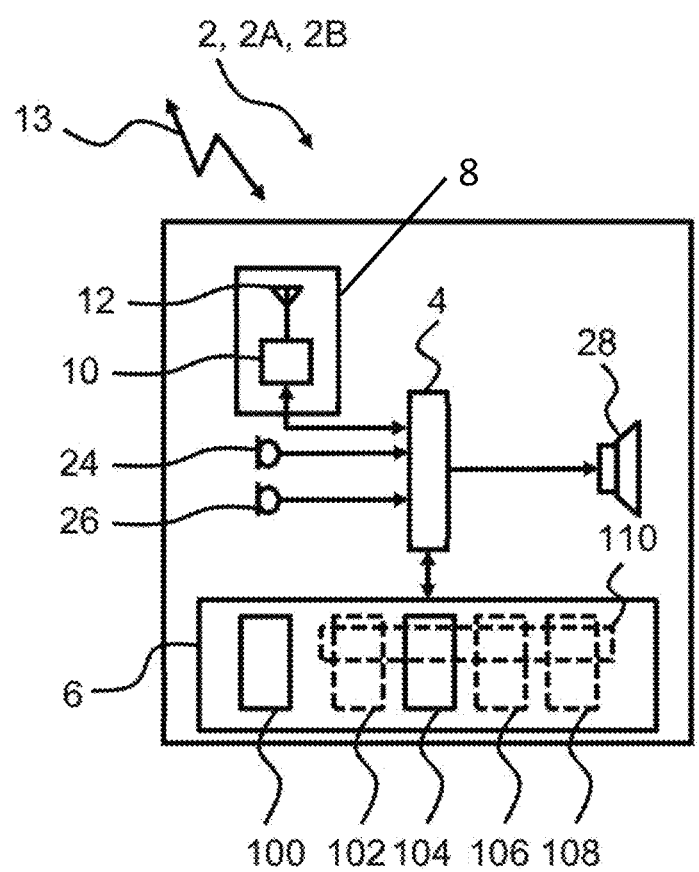
FIG. 2 shows exemplary hearing devices.

The present disclosure provides an exemplary method for operating a hearing device, such as a hearing disclosed herein, such as hearing device 2 of FIG. 2. The method comprises determining if the hearing device is configured to operate as a customer hearing device based on customer data optionally stored in one or more certificates in the memory unit of the hearing device. The method may comprise in accordance with a determination that the hearing device is configured to operate as a customer hearing device, operating the hearing device according to the second primary certificate.

In one or more exemplary methods, the method may comprise in accordance with a determination that the hearing device is not configured to operate as a customer hearing device, operating the hearing device according to the first primary certificate and/or forgoing to operate the hearing device according to the second primary certificate.

In one or more exemplary methods, determining if the hearing device is configured to operate as a customer hearing device based on the customer data comprises determining if the second primary certificate is valid. In one or more exemplary methods, in accordance with a determination that the second primary certificate is not valid, forgoing to operate the hearing device according to the second primary certificate. In one or more exemplary methods, forgoing to operate the hearing device according to the second primary certificate may comprise aborting normal hearing device operation or putting the hearing device in a repair mode or service mode.

In one or more exemplary methods, determining if the second primary certificate is valid comprises verifying a second primary signature of the second primary certificate and wherein the second primary certificate is not valid if the signature of the second primary certificate is not verified. The second primary certificate may be verified using a second primary certificate key, e.g. stored in second secondary certificate or second tertiary certificate.

In one or more exemplary methods, determining if the second primary certificate is valid comprises comparing the first primary hearing device identifier and the second primary hearing device identifier, and wherein the second primary certificate is not valid if the first primary hearing device identifier is different from the second primary hearing device identifier.

In one or more exemplary methods, the second primary certificate comprises a second primary customer identifier. Determining if the second primary certificate is valid optionally comprises comparing the second primary customer identifier with (other) customer identifier(s) of the customer data, such as one or more, e.g. all, of first secondary customer identifier, second secondary customer identifier, and second tertiary customer identifier. In one or more exemplary methods, the second primary certificate is not valid if the second primary customer identifier is different from a customer identifier of the customer data.

In one or more exemplary methods, the second primary certificate comprises one or more second keysets including a second primary keyset comprising one or more second primary keys and a second primary key identifier, and wherein operating the hearing device according to the second primary certificate comprises setting up a connection to an accessory device/second user application based on a second primary key of the second primary keyset.

In one or more exemplary methods, setting up a connection to an accessory device/second user application comprises obtaining a session key. In one or more exemplary methods, setting up a connection to an accessory device/second user application comprises encrypting the session key with the second primary key of the second primary keyset to obtain an encrypted session key. In one or more exemplary methods, setting up a connection to an accessory device comprises transmitting the encrypted session key to the accessory device.

The present disclosure provides a method for operating a hearing device, such as a hearing disclosed herein, such as hearing device 2A of FIG. 2. The memory unit has stored therein a first primary customer device identifier, such as first secondary hardware identifier HW_ID_1_2. In one or more exemplary methods, the memory unit has stored therein a first model certificate, such as first secondary certificate 102, comprising a first customer identifier, such as CID_1_2. In one or more exemplary methods, the memory unit has stored therein second model data comprising a second model customer identifier, and second model information data indicative of one or more available models for the hearing device. The method comprises verifying the second model data and may comprise operating the hearing device according to the second model information data, e.g. upon successful verification of the second model data.

In one or more exemplary methods, verifying the second model data comprises obtaining a current model identifier and to compare the current model identifier with the second model information data.

In one or more exemplary methods, the verification of the second model data is successful when the current model identifier satisfies a model criterion based on the second model information data, e.g. if the current model identifier is indicative of a hearing device model of a set available hearing device models in the second model information data.

In one or more exemplary methods, verifying the second model data comprises determining if the second model customer identifier corresponds to, matches, or is the same as the first customer identifier, and wherein the verification of the second model data optionally is successful when the second model customer identifier corresponds to, matches, or is the same as the first customer identifier.

In one or more exemplary methods, the memory unit has stored therein a second model certificate comprising the second model data and a second secondary signature. In one or more exemplary methods, verifying the second model data comprises verifying the second secondary signature. In one or more exemplary methods, the verification of the second model data is successful when the verification of the second secondary signature is successful.

In one or more exemplary methods, the second model data comprises a second customer device identifier. In one or more exemplary methods, verifying the second model data comprises determining if the second customer device identifier corresponds to, matches, or is the same as the first primary customer device identifier. In one or more exemplary methods, the verification of the second model data is successful when the second customer device identifier corresponds to, matches, or is the same as the first primary customer device identifier.

In one or more exemplary methods, verifying the second model data comprises determining if the second model customer identifier corresponds to, matches, or is the same as the second tertiary customer identifier.

In one or more exemplary methods, the verification of the second model data is successful when the second model customer identifier corresponds to, matches, or is the same as the second tertiary customer identifier.

The present disclosure provides a method for operating a hearing device, such as a hearing disclosed herein, such as hearing device 2B of FIG. 2. Optionally, the memory unit has stored therein a second primary certificate comprising a second primary hearing device identifier and/or second key data for third-party control of the hearing device. The second key data comprises one or more second keysets including a second primary keyset.

In one or more exemplary methods, the method comprises verifying the second primary certificate, e.g. by verifying the second primary hearing device identifier and/or a second primary signature of the second primary certificate. The method optionally comprises in accordance with successfully verifying the second primary certificate, communicating with a third-party entity, such as a second server device and/or a second client/tablet/fitting/dispenser device, based on the second key data.

In one or more exemplary methods, the second primary keyset is a fitting device keyset configured to secure communication with a fitting device being the third-party entity. In other words, the second primary keyset may ensure secure communication between the hearing device and a second client/tablet/fitting/dispenser device and/or a fitting application installed and running on the second tablet/fitting/dispenser device. The second primary keyset may comprise a second primary key identifier and/or one or more keys.

In one or more exemplary methods, the one or more second key sets include a second secondary keyset, wherein the second secondary keyset optionally is a third-party server keyset configured to secure communication with a third-party server (second server device) being the third-party entity.

In one or more exemplary methods, verifying the second primary certificate comprises verifying the second primary hearing device identifier, e.g. based on the first primary hearing device identifier.

In one or more exemplary methods, the memory unit has stored therein a second primary certificate key, and verifying the second primary certificate optionally comprises verifying a second primary signature of the second primary certificate based on the second primary certificate key.

In one or more exemplary methods, communicating with the third-party entity based on the second key data comprises verifying communication data based on the second primary keyset.

In one or more exemplary methods, communicating with the third-party entity based on the second key data comprises verifying communication data based on the second secondary keyset.

In one or more exemplary methods, communicating with the third-party entity based on the second key data comprises applying a third-party operating system in the processing unit.

In one or more exemplary methods, the method comprises aborting normal hearing device operation, e.g. entering a service mode or repair mode and/or forgoing compensating for hearing loss of the user and/or switching the hearing device off, in accordance with failure in verifying the second primary certificate, such as in accordance with failure in verifying one or more of second primary signature, second hearing device identifier, and second primary customer identifier.

In one or more exemplary methods, the method optionally comprises forgoing communicating with the third-party entity, in accordance with failure in verifying communication data, e.g. comprising forgoing communicating with the third-party entity in accordance with failure in verifying communication data based on the second primary keyset and/or forgoing communicating with the third-party entity in accordance with failure in verifying communication data based on the second secondary keyset.

Forgoing communicating with the third-party entity may comprise entering a service mode or repair mode and/or forgoing compensating for hearing loss of the user and/or switching the hearing device off. Thus, forgoing communicating with the third-party entity may comprise aborting normal hearing device operation of the hearing device.

The memory unit may have customer data indicative of the hearing device being configured to operate as a customer hearing device stored therein. The customer data may be stored in one or more certificates and/or outside the certificates, i.e. not being a part of the certificates. In other words, the memory unit may comprise customer data. The customer data may comprise one or more customer identifiers and/or BLE identifiers.

The memory unit may have a first primary certificate stored therein. In other words, the memory unit may comprise a first primary certificate. The first primary certificate may comprise a first primary signature also denoted S_1_1 being a digital signature.

The first primary certificate may comprise a first primary hearing device identifier also denoted HDID_1_1.

The first primary certificate may comprise one or more, such as a plurality of, keysets including a first primary keyset and optionally a first secondary keyset. Keysets of the first primary certificate may be used for communication with devices/applications controlled by the manufacturer of the hearing device, e.g. in a first domain and/or a second domain. The use of first keyset(s) in the second domain depends on the desired degree of control from the OEM customer. For example, the OEM customer may desire to have control of the second user application (e.g. via second primary keyset) while using the manufacturers backbone architecture (first server device and/or first client/fitting device). The manufacturer of the hearing device may be an original equipment manufacturer (OEM).

The first primary keyset may be used for communication with an accessory device and/or a first user application installed and running on the accessory device, such as a smartphone, e.g. an accessory device and/or a first user application controlled by the hearing device manufacturer.

The first secondary keyset may be used for communication with a first tablet/fitting/dispenser device and/or a fitting application installed and running on the tablet/fitting/dispenser device, such as a tablet, a portable computer, or a stationary computer. The first tablet/fitting/dispenser device may be controlled by the hearing device manufacturer.

In the present disclosure, a keyset refers to a set of keys, e.g. used for securing communication between the hearing device and external devices, such as server device(s), client/fitting devices, and/or accessory device(s). A keyset comprises one or more keys, such as one, two, three, four, or more keys, and optionally a key identifier or a set of key identifiers.

A keyset may comprise or consist of a number of different keys. The number of keys in a keyset may be in the range from three to ten. A keyset consisting of three to six keys and one or more key identifiers may be advantageous given the limited memory size and the desire to provide enough keys for enabling future operation of the hearing device without requiring a tedious and time-consuming update of certificate(s).

As used herein, the term "key" refers to a cryptographic key, i.e. a piece of data, (e.g. a string, a parameter) that determines a functional output of a cryptographic algorithm. For example, during encryption, the key allows a transformation of a plaintext into a cipher-text and vice versa during decryption. The key may also be used to verify a digital signature and/or a message authentication code, MAC. A key is so called a symmetric key when the same key is used for both encryption and decryption. In asymmetric cryptography or public key cryptography, a keying material is a key pair, so called a private-public key pair comprising a public key and a private key. In an asymmetric or public key cryptosystem (such as Rivest Shamir Adelman, RSA, cryptosystem or Elliptic curve cryptography, ECC), the public key is used for encryption and/or signature verification while the private key is used for decryption and/or signature generation.

As used herein the term "identifier" refers to a piece of data that is used for identifying, such as for categorizing, and/or uniquely identifying. The identifier may be in a form of a word, a number, a letter, a symbol, a list, an array or any combination thereof. For example, the identifier as a number may be in the form of an integer, such as unsigned integer, unit, with a length of e.g. 8 bits, 16 bits, 32 bits, etc., such as an array of unsigned integers. A key identifier may indicate or identify a key to be used as keying material for securing a communication with an external party, such as with a client device, accessory device and/or server device. A key identifier of a keyset may indicate a key or keys that are part of the keyset. The number of key identifiers of a keyset may correspond to the number of keys in the keyset, i.e. each key may have a corresponding key identifier in the keyset. A key identifier of a keyset may point to and/or identify a key amongst a plurality of keys in the keyset.

The first primary keyset may comprise a plurality of keys, such as two, three, four, or more keys, and optionally a key identifier. In one or more exemplary hearing devices/methods, the first primary keyset, also denoted KEY_SET_1_1, comprises four keys KEY_1_1_1, KEY_1_1_2, KEY_1_1_3, and KEY_1_1_4. The first primary keyset optionally comprises a first primary key identifier, also denoted KEY_ID_1_1. For example, the first primary key identifier KEY_ID_1_1 having the value of "5" may indicate that the first primary keyset/first primary certificate includes a first primary key KEY_1_1_1 with identifier "5", and optionally increments of the key identifier, such as first primary key KEY_1_1_2 with key identifier "6", first primary key KEY_1_1_3 with key identifier "7", and/or first primary key KEY_1_1_4 with key identifier "8".

The first secondary keyset may comprise a plurality of keys, such as two, three, four, or more keys, and optionally a key identifier. In one or more exemplary hearing devices/methods, the first secondary keyset, also denoted KEY_SET_1_2, comprises four keys KEY_1_2_1, KEY_1_2_2, KEY_1_2_3, and KEY_1_2_4. The first secondary keyset optionally comprises a first secondary key identifier, also denoted KEY_ID_1_2.

The first primary certificate may comprise a first tertiary keyset. The first tertiary keyset may comprise a plurality of keys, such as two, three, four, or more keys, and optionally a key identifier. In one or more exemplary hearing devices/methods, the first tertiary keyset, also denoted KEY_SET_1_3, comprises four keys KEY_1_3_1, KEY_1_3_2, KEY_1_3_3, and KEY_1_3_4. The first tertiary keyset optionally comprises a first tertiary key identifier, also denoted KEY_ID_1_3.

The first tertiary keyset may be used for communication with a first server device such as a manufacturer server device. In other words, the first server device may be controlled by the hearing device manufacturer.

The first primary certificate may comprise a first quaternary keyset. The first primary certificate may comprise a first quinary keyset.

The first primary certificate may comprise a first primary hardware identifier. The first primary hardware identifier may be used for determining if the first primary certificate is valid, e.g. by comparing the first primary hardware identifier with a second hardware identifier, e.g. stored in the second part of the memory unit.

A hardware identifier may identify a piece of hardware comprised in the hearing device, such as a radio chip comprised in the hearing device and/or a digital signal processor of the hearing device. The hardware identifier(s) may be stored in a register of the piece of hardware comprised in the hearing device during manufacturing of the piece of hardware. The hardware identifier may comprise a serial number of the hardware, a chip identifier, or any combination thereof. The hearing device receiving or retrieving from the memory unit a certificate comprising the hardware identifier may verify the certificate by comparing its stored hardware identifier and the corresponding hardware identifier comprised in the certificate. Such verification may be performed upon reception of the certificate, and/or upon retrieval of the certificate from the memory unit, such as at boot or power-on of the hearing device.

The first primary certificate may comprise first primary customer data indicative of the hearing device being configured to operate as a customer hearing device.

The memory unit may have a first secondary certificate stored therein. In other words, the memory unit may comprise a first secondary certificate. The first secondary certificate may comprise a first secondary signature also denoted S_1_2 being a digital signature.

The first secondary certificate may comprise first secondary customer data indicative of the hearing device being configured to operate as a customer hearing device.

In other words, first secondary customer data, such as a first secondary customer identifier may be stored in the first secondary certificate.

The first secondary certificate may comprise a BLE identifier also denoted first secondary BLE identifier.

The first secondary certificate may comprise a first secondary hardware identifier. The first secondary hardware identifier may be used for determining if the first secondary certificate is valid, e.g. by comparing the first secondary hardware identifier with a first hardware identifier, e.g. stored in the second part of the memory unit.

The memory unit may have a second primary certificate stored therein. In other words, the memory unit may comprise a second primary certificate. The second primary certificate may comprise a second primary signature also denoted S_2_1 being a digital signature. The second primary certificate may comprise customer data indicative of the hearing device being configured to operate as a customer hearing device. In other words, second primary customer data, such as a second primary customer identifier also denoted CID_2_1 may be stored in the first secondary certificate.

The second primary certificate may comprise a second primary hearing device identifier also denoted HDID_2_1. The second primary certificate may comprise one or more, such as a plurality of, keysets including a second primary keyset and optionally a second secondary keyset.

One or more keysets of the second primary certificate may be used for communication with devices/applications controlled by a customer of the hearing device manufacturer, such as an OEM customer, e.g. in a second domain. The present certificate architecture allows an OEM to keep full control of the use of their hearing devices (in the first domain) and at the same time allows the OEM to assign control rights to an OEM customer (in the second domain).

The second primary keyset may be used for communication with an accessory device and/or a second user application installed and running on the accessory device, such as a smartphone, e.g. an accessory device and/or a second user application controlled by the OEM customer. Thus, the OEM customer or third party may provide and operate his own user application. In other words, the second primary keyset may be an OEM mobile application keyset. The second primary keyset may be used for communication with a second client/tablet/fitting/dispenser device and/or a fitting application installed and running on the second tablet/fitting/dispenser device, such as a tablet, a portable computer, or a stationary computer, wherein the tablet/fitting/dispenser device and/or a fitting application is optionally controlled by the OEM customer. In other words, the second primary keyset may be an OEM tablet/fitting keyset also denoted a (second) fitting device keyset, e.g. configured to secure communication with a third-party tablet/fitting/dispenser device being the third-party entity.

The second primary keyset may comprise a plurality of keys, such as two, three, four, or more keys, and optionally a key identifier. In one or more exemplary hearing devices/methods, the second primary keyset, also denoted KEY_SET_2_1, comprises four keys KEY_2_1_1, KEY_2_1_2, KEY_2_1_3, and KEY_2_1_4. The second primary keyset optionally comprises a second primary key identifier, also denoted KEY_ID_2_1.

The second secondary keyset may comprise a plurality of keys, such as two, three, four, or more keys, and optionally a key identifier. In one or more exemplary hearing devices/methods, the second secondary keyset, also denoted KEY_SET_2_2, comprises four keys KEY_2_2_1, KEY_2_2_2, KEY_2_2_3, and KEY_2_2_4. The second secondary keyset optionally comprises a second secondary key identifier, also denoted KEY_ID_2_2.

The second secondary keyset may be used for communication with a second client/tablet/fitting/dispenser device and/or a fitting application installed and running on the tablet/fitting/dispenser device, such as a tablet, a portable computer, or a stationary computer, wherein the tablet/fitting/dispenser device and/or a fitting application is optionally controlled by the OEM customer. In other words, the second secondary keyset may be an OEM tablet/fitting keyset. The second secondary keyset may be used for communication with a second server device, e.g. controlled by the OEM customer. In other words, the second secondary keyset may be an OEM server/cloud keyset also denoted a third-party server keyset, e.g. configured to secure communication with a third-party server being the third-party entity.

The second primary certificate may comprise a second tertiary keyset. The second tertiary keyset may comprise a plurality of keys, such as two, three, four, or more keys, and optionally a key identifier. In one or more exemplary hearing devices/methods, the second tertiary keyset, also denoted KEY_SET_2_3, comprises four keys KEY_2_3_1, KEY_2_3_2, KEY_2_3_3, and KEY_2_3_4. The second tertiary keyset optionally comprises a second tertiary key identifier, also denoted KEY_ID_2_3.

The second tertiary keyset may be used for communication with a second server device, e.g. controlled by the OEM customer. In other words, the second tertiary keyset may be an OEM server/cloud keyset.

The second primary certificate may comprise a second quaternary keyset. The second primary certificate may comprise a second quinary keyset.

The memory unit may have a second secondary certificate also denoted second model certificate stored therein. In other words, the memory unit may comprise a second secondary certificate. The second secondary certificate may comprise a second secondary signature also denoted S_2_2 being a digital signature. The second secondary certificate may comprise customer data indicative of the hearing device being configured to operate as a customer hearing device. In other words, second secondary customer data, such as a second secondary customer identifier also denoted CID_2_2 may be stored in the second secondary certificate.

The second secondary certificate may comprise a second secondary hardware identifier. The second secondary hardware identifier may be used for determining if the second secondary certificate is valid, e.g. by comparing the second secondary hardware identifier with a first hardware identifier, e.g. stored in the second part of the memory unit.

The memory unit may have second model data stored therein. The second model data may be stored in one or more certificates and/or outside the certificates, i.e. not being a part of the certificates. In other words, the memory unit may comprise the second model data. The second model data may be stored or at least partly stored in the second secondary certificate. In other words, the second secondary certificate may be referred to as a second model certificate. The second model data optionally comprises a second model customer identifier, such as the second secondary customer identifier of the second secondary certificate. In other words, the second secondary customer identifier may be referred to as a second model customer identifier. Second certificates may all have a customer identifier stored thereon facilitating identification of the certificates from the manufacturer perspective and/or enabling more effective debugging.

The second model data optionally comprises second model information data also denoted MID_2 indicative of one or more available models for the hearing device, e.g. such as indicative of one or more available models for the hearing device when the hearing device is configured as a customer hearing device. The second model information data may be or comprise a second model identifier of the second secondary certificate. Thus, the second model certificate/second secondary certificate may comprise the second model information data. Implementation of second model information data in the security architecture enables an OEM customer to configure or assign a specific model or set of available models.

The use of a second secondary hardware identifier in the second secondary certificate together with second model data prevents cloning of the second model data to another hearing device by a mere copying of the second secondary certificate to the other hearing device.

The memory unit may have a second tertiary certificate stored therein. In other words, the memory unit may comprise a second tertiary certificate. The second tertiary certificate may comprise a second tertiary signature also denoted S_2_3 being a digital signature. The second tertiary certificate may comprise customer data indicative of the hearing device being configured to operate as a customer hearing device. In other words, second tertiary customer data, such as a second tertiary customer identifier also denoted CID_2_3 may be stored in the second tertiary certificate.

The memory unit may have a one or more certificate keys stored therein. One or more certificate keys may be stored in the first memory part. One or more certificate keys may be stored in the second memory part. A certificate key may be a public key. A certificate key may be used for verifying a digital signature of one or more certificates stored in the memory unit. A certificate key may be stored in a certificate and optionally used for verifying a signature of another certificate. A certificate key may be used for verifying a signature of one certificate only. In other words, each certificate may have its own certificate key.

The memory unit may have a first primary certificate key stored therein. The first primary certificate key also denoted C_KEY_1_1 may be configured to or used for verifying the first primary signature. The first primary certificate key may be stored in the second memory part.

The processing unit may be configured to verify the first primary certificate e.g. based on the first primary certificate key. The processing unit may be configured to, in accordance with the first primary certificate not being verified, abort normal operation of the hearing device. To verify the first primary certificate may comprise to verify the first primary signature with a certificate key, such as the first primary certificate key C_KEY_1_1.

The memory unit may have a first secondary certificate key stored therein. The first secondary certificate key also denoted C_KEY_1_2 may be configured to or used for verifying the first secondary signature. The first secondary certificate key may be stored in the second memory part.

The processing unit may be configured to verify the first secondary certificate. The processing unit may be configured to, in accordance with the first secondary certificate not being verified, abort normal operation of the hearing device. To verify the first secondary certificate may comprise to verify the first secondary signature with a certificate key, such as the first secondary certificate key.

The memory unit may have a second primary certificate key stored therein. The second primary certificate key also denoted C_KEY_2_1 may be configured to or used for verifying the second primary signature. The second primary certificate key may be stored in the first memory part, such as in the second tertiary certificate.

The processing unit may be configured to verify the second primary certificate. The processing unit may be configured to, in accordance with the second primary certificate not being verified, abort normal operation of the hearing device. To verify the second primary certificate may comprise to verify the second primary signature with a certificate key, such as the second primary certificate key.

The memory unit may have a second secondary certificate key stored therein. The second secondary certificate key also denoted C_KEY_2_2 may be configured to or used for verifying the second secondary signature. The second secondary certificate key may be stored in the first memory part, such as in the second tertiary certificate.

The processing unit may be configured to verify the second secondary certificate. The processing unit may be configured to, in accordance with the second secondary certificate not being verified, abort normal operation of the hearing device. To verify the second secondary certificate may comprise to verify the second secondary signature with a certificate key, such as the second secondary certificate key.

The memory unit may have a second tertiary certificate key stored therein. The second tertiary certificate key also denoted C_KEY_2_3 may be configured to or used for verifying the second tertiary signature. The second tertiary certificate key may be stored in the second memory part. The second tertiary certificate key may be stored in the first memory part, such as in the first secondary certificate.

The processing unit may be configured to verify the second tertiary certificate. The processing unit may be configured to, in accordance with the second tertiary certificate not being verified, abort normal operation of the hearing device. To verify the second tertiary certificate may comprise to verify the second tertiary signature with a certificate key, such as the second tertiary certificate key.

The processing unit may be configured to verify second certificate(s) in accordance with a determination that the hearing device is configured to operate as a customer hearing device, e.g. in accordance with the first secondary customer identifier is indicative of the hearing device being configured to operate as a customer hearing device, e.g. if the first secondary customer identifier is different from a manufacturer identifier or if the first secondary customer identifier belongs to a set of customer identifiers stored in the memory unit.

The memory part, such as the second memory part, may have one or more hardware identifiers stored therein. For example, the second memory part may have a first hardware identifier stored therein. The second memory part may have a second hardware identifier stored therein.

The processing unit may be configured to compare the first hardware identifier with the first secondary hardware identifier of the first secondary certificate. The processing unit may be configured to, in accordance with the first hardware identifier not matching the first secondary hardware identifier, abort normal operation of the hearing device.

The processing unit may be configured to compare the first hardware identifier with the second secondary hardware identifier of the second secondary certificate. The processing unit may be configured to, in accordance with the first hardware identifier not matching the second secondary hardware identifier, abort normal operation of the hearing device.

The processing unit may be configured to compare the second hardware identifier with the first primary hardware identifier of the first primary certificate. The processing unit may be configured to, in accordance with the second hardware identifier not matching the first primary hardware identifier, abort normal operation of the hearing device.

The processing unit may be configured to compare the first secondary customer identifier with one or more of the second primary customer identifier, the second secondary customer identifier, and the first tertiary customer identifier.

The processing unit may be configured to, in accordance with the first secondary customer identifier being different from one or more of the second primary customer identifier, the second secondary customer identifier, and the first tertiary customer identifier, abort normal operation of the hearing device.

FIG. 1 shows communication between entities in a hearing system comprising a hearing device 2, 2A, 2B, the hearing device 2, 2A, 2B comprising a processing unit 4 configured to compensate for hearing loss of a user of the hearing device; a memory unit 6, and an interface 8. The interface 8 comprises a transceiver 10 and an antenna 12, the interface 8 configured for wireless communication 13, e.g. at frequencies in the range from 2.4 to 2.5 GHz with one or more of an accessory device 14, first client/fitting device 16, second client/fitting device 18, first server device 20, and second server device 22. The hearing device 2, 2A, 2B comprises one or more microphones including first microphone 24 and optionally second microphone 26. The hearing device 2, 2A, 2B comprises a receiver 28 for converting an electrical output signal from the processing unit 4 to an audio output.

The accessory device 14 comprises a processing unit 30, a memory unit 32 and an interface 34, the memory unit 32 and the interface 34 respectively connected to the processing unit 30. The memory unit may include removable and non-removable data storage units including, but not limited to, Read Only Memory (ROM), Random Access Memory (RAM), etc. The memory unit 30 has a first user application 36 and/or a second user application 38 stored thereon. The interface 34 is configured for wireless communication in one or more frequency ranges, e.g. at frequencies in the frequency range from 2.4 to 2.5 GHz and/or in one or more GSM bands. A first user application 36 and/or a second user application 38 is stored in the memory unit 32 of the accessory device 14.

FIG. 2 shows exemplary hearing devices, such as hearing device 2, 2A, 2B. The hearing device 2, 2A, 2B comprises a processing unit 4 configured to compensate for hearing loss of a user of the hearing device, a memory unit 6, and an interface 8.

The memory unit 6 has stored therein one or more of a first primary certificate 100, a first secondary certificate 102, a second primary certificate 104, a second secondary certificate 106, and a second tertiary certificate 108. The memory unit 6 optionally has stored therein customer data 110, e.g. as part of the first secondary certificate 102, the customer data indicative of the hearing device being configured to operate as a customer hearing device.

In one or more exemplary hearing devices, such as hearing device 2, the processing unit 4 is configured to determine if the hearing device 2 is configured to operate as a customer hearing device based on the customer data 110. Optionally, the processing unit 4 is configured to, in accordance with a determination that the hearing device 2 is configured to operate as a customer hearing device, operate the hearing device 2 according to the second primary certificate. The first primary certificate 100 may be different from the second primary certificate 104.

In one or more exemplary hearing devices, such as hearing device 2, the processing unit 4 is configured to, in accordance with a determination that the hearing device is not configured to operate as a customer hearing device, operate the hearing device according to one or more first certificates, e.g. the first primary certificate 100. The first secondary certificate 102 may comprise customer data 110.

The customer data 110 may comprise BLE identifier and/or customer identifier(s) indicative of a customer, see FIG. 3.

In one or more exemplary hearing devices, such as hearing device 2, to determine if the hearing device 2 is configured to operate as a customer hearing device based on the customer data comprises determining if the second primary certificate 104 is valid. In one or more exemplary hearing devices, such as hearing device 2, the processing unit 4 is configured to, in accordance with a determination that the second primary certificate 104 is not valid, forgo to operate the hearing device 2 according to the second primary certificate.

In one or more exemplary hearing devices, such as hearing device 2, determining if the second primary certificate 104 is valid comprises verifying a second primary signature of the second primary certificate 104, e.g. with a second primary certificate key optionally stored in or being part of the second tertiary certificate 108 or the second secondary certificate 106. In one or more exemplary hearing devices, such as hearing device 2, the second primary certificate 104 is not valid if the second primary signature of the second primary certificate is not verified.

In one or more exemplary hearing devices, such as hearing device 2, determining if the second primary certificate 104 is valid comprises comparing the first primary hearing device identifier and the second primary hearing device identifier. In one or more exemplary hearing devices, such as hearing device 2, determining if the second primary certificate 104 is valid comprises comparing the first primary hearing device identifier and/or the second primary hearing device identifier with a hearing device identifier stored in a locked (second) part of the memory unit 6. In one or more exemplary hearing devices, the second primary certificate 104 is not valid if the first primary hearing device identifier is different from the second primary hearing device identifier. In one or more exemplary hearing devices, the second primary certificate 104 is not valid if one or more of the first primary hearing device identifier and the second primary hearing device identifier is different from the hearing device identifier stored in the locked part of the memory unit.

In one or more exemplary hearing devices, such as hearing device 2, the second primary certificate 104 comprises a second primary customer identifier of the customer data 110. In one or more exemplary hearing devices, such as hearing device 2, determining if the second primary certificate 104 is valid comprises comparing the second primary customer identifier with one or more other customer identifiers of the customer data 110. In one or more exemplary hearing devices, such as hearing device 2, the second primary certificate 104 is not valid if the second primary customer identifier is different from a first secondary customer identifier of the customer data 110. The first secondary customer identifier of the customer data 110 is optionally stored in or forming part of the first secondary certificate.

In one or more exemplary hearing devices, such as hearing device 2, the second primary certificate comprises one or more second keysets including a second primary keyset comprising one or more second primary keys and a second primary key identifier. In one or more exemplary hearing devices, such as hearing device 2, to operate the hearing device according to the second primary certificate 104 comprises setting up a connection to an accessory device/second user application 38 based on a second primary key of the second primary keyset.

In one or more exemplary hearing devices, such as hearing device 2, setting up a connection to an accessory device 14/second user application 38 comprises obtaining a session key. In one or more exemplary hearing devices, setting up a connection to an accessory device 14/second user application 38 comprises encrypting the session key with the second primary key of the second primary keyset to obtain an encrypted session key. In one or more exemplary hearing devices, such as hearing device 2, setting up a connection to an accessory device comprises transmitting the encrypted session key to the accessory device.

FIG. 2 shows an exemplary hearing device 2A comprising a processing unit 4 configured to compensate for hearing loss of a user of the hearing device; an interface 8; and a memory unit 6. The memory unit 6 has stored therein a first primary customer device identifier, e.g. HW_ID_1_2 of first secondary certificate 102. The memory unit 6 has stored therein a first model certificate, e.g. first secondary certificate 102, comprising a first customer identifier, e.g. first secondary customer identifier CID_1_2, see FIG. 3. The memory unit 6 has stored therein second model data, e.g. as part of second secondary certificate 106, comprising a second model customer identifier, e.g. second secondary customer identifier CID_2_2, see FIG. 3, and second model information data, e.g. second model information data MID_2, see FIG. 3 indicative of one or more available models for the hearing device.

The processing unit 4 is configured to verify the second model data, such as CID 2_2 and/or MID_2. The processing unit 4 is configured to upon successful verification of the second model data, operate the hearing device 2A according to the second model information data, e.g. comprising to operate the hearing device 2A according to the second primary certificate.

In one or more exemplary hearing devices 2A, to verify the second model data comprises to obtain a current model identifier and to compare the current model identifier with the second model information data, e.g. MID_2, see FIG. 3. In one or more exemplary hearing devices 2A, the verification of the second model data is successful when the current model identifier satisfies a model criterion based on the second model information data.

In one or more exemplary hearing devices 2A, to verify the second model data comprises to determine if the second model customer identifier, e.g. CID_2_2, see FIG. 3, corresponds to the first customer identifier, e.g. CID_1_2, see FIG. 3. In one or more exemplary hearing devices, the verification of the second model data is successful when the second model customer identifier corresponds to the first customer identifier.

In one or more exemplary hearing devices, the memory unit 6 has stored therein a second model certificate, e.g. second secondary certificate 106, see FIG. 3, comprising the second model data and a second secondary signature, e.g. S_2_2, see FIG. 3. In one or more exemplary hearing devices, to verify the second model data comprises to verify the second secondary signature, e.g. S_2_2, see FIG. 3. In one or more exemplary hearing devices, the verification of the second model data is successful when the verification of the second secondary signature is successful.

In one or more exemplary hearing devices, the second model data comprising a second customer device identifier, e.g. HW_ID_2_2, see FIG. 3. In one or more exemplary hearing devices, to verify the second model data comprises to determine if the second customer device identifier corresponds to the first primary customer device identifier, e.g. HW_ID_1_2, see FIG. 3. In one or more exemplary hearing devices, the verification of the second model data is successful when the second customer device identifier, e.g.

HW_ID_2_2, see FIG. 3, corresponds to the first primary customer device identifier, e.g. HW_ID_1_2, see FIG. 3.

The hearing device 2A is optionally configured to operate as a customer hearing device based on the first customer identifier.

In one or more exemplary hearing devices 2A, the memory unit 6 has stored therein a second key certificate, e.g. second tertiary certificate 108, comprising a second model key, e.g. second secondary certificate key C_KEY_2_2.

In one or more exemplary hearing devices, the second key certificate 108 comprises a second tertiary customer identifier, e.g. CID_2_3, see FIG. 3. In one or more exemplary hearing devices, to verify the second model data comprises to determine if the second model customer identifier corresponds to the second tertiary customer identifier, e.g. if CID_2_2=CID_2_3. In one or more exemplary hearing devices, the verification of the second model data is successful when the second model customer identifier corresponds to the second tertiary customer identifier.

FIG. 2 shows an exemplary hearing device 2B. The hearing device 2B comprises a processing unit 4 configured to compensate for hearing loss of a user of the hearing device, an interface 8; and a memory unit 6. The memory unit 6 has stored therein a first primary certificate 100 comprising a first primary hearing device identifier HDID_1_1, see FIG. 3. The memory unit 6 has stored therein a second primary certificate 104 comprising a second primary hearing device identifier HD_ID_2_1 and second key data, e.g. one or more of KEY_SET_2_1, KEY_SET_2_2, and KEY_SET_2_3, for third-party control of the hearing device 2B. The second key data comprises optionally one or more second keysets including a second primary keyset KEY_SET_2_1.

The processing unit 4 is configured to verify the second primary certificate and in accordance with a successful verification of the second primary certificate, the processing unit 4 is configured to communicate with a third-party entity, e.g. second fitting device 18 and/or second server device 22 based on the second key data.

The processing unit 4 is optionally configured to abort normal hearing device operation, e.g. entering a service mode or repair mode and/or forgoing compensating for hearing loss of the user and/or switching the hearing device off, in accordance with a failure in verifying the second primary certificate.

In one or more exemplary hearing devices, the second primary keyset KEY_SET_2_1 is a fitting device keyset configured to secure communication with a fitting device being the third party entity. The second primary keyset comprises a second primary key identifier and/or one or more second primary keys.

In one or more exemplary hearing devices, the one or more second key sets include a second secondary keyset KEY_SET_2_2, wherein optionally the second secondary keyset or a second tertiary keyset is a third-party server keyset configured to secure communication with a third-party server being the third-party entity. In hearing device 2B, to verify the second primary certificate optionally comprises to verify the second primary hearing device identifier e.g. based on the first primary hearing device identifier. Thus reuse of the second primary certificate in other hearing devices is prevented.

In one or more exemplary hearing devices 2B, the memory unit 6 has stored therein a second primary certificate key and to verify the second primary certificate optionally comprises to verify a second primary signature of the second primary certificate based on the second primary certificate key.

In hearing device 2B, to verify the second primary certificate optionally comprises to verify a second primary customer identifier of the second primary certificate, e.g. based on first secondary customer identifier. Thus reuse of the second primary certificate in for different customers is prevented.

In one or more exemplary hearing devices 2B, to communicate with a third-party entity 18, 22 based on the second key data comprises to verify communication data based on the second primary keyset.

In one or more exemplary hearing devices 2B, to communicate with a third-party entity 18, 22 based on the second key data comprises to verify communication data based on the second secondary keyset.

In one or more exemplary hearing devices 2B, to communicate with a third-party entity based on the second key data comprises to apply, such as one or more of run, deploy, install, operate according to, and store in memory unit, a third-party operating system in the processing unit 4.

FIG. 3 shows an exemplary memory unit of a hearing device, such as hearing device 2, 2A, 2B.

The memory unit 6 has stored therein one or more of a first primary certificate 100, a first secondary certificate 102, a second primary certificate 104, a second secondary certificate 106, and a second tertiary certificate 108. The certificates 100, 102, 104, 106, 108 are optionally stored in a first part 7A of the memory unit, the first part 7A being a writeable part of the memory unit.

The first primary certificate 100 comprises a first primary signature S_1_1 being a digital signature. The first primary signature S_1_1 may be verified or verifiable by a first primary certificate key C_KEY_1_1 optionally comprised in a second part 7B of the memory unit 6. The second part 7B of the memory unit 6 is locked and/or write-protected.

The first primary certificate 100 comprises a first primary hearing device identifier HDID_1_1. The first primary hearing device identifier may uniquely identify the hearing device. The first primary certificate 100 comprises one or more keysets including a first primary keyset KEY_SET_1_1, a first secondary keyset KEY_SET_1_2, and a first tertiary keyset KEY_SET_1_3. The first primary certificate 100 optionally comprises a first quaternary keyset KEY_SET_1_4 and/or first quinary keyset KEY_SET_1_5. The first primary certificate 100 optionally comprises a first primary hardware identifier HW_ID_1_1. The hearing device may be configured to compare the first primary hardware identifier HW_ID_1_1 with a second hardware identifier HDW_ID_2 stored in the second part 7B of the memory unit 6, e.g. during startup or booting of the hearing device and/or as part of determining if the first primary certificate 100 is valid.

The hearing device is configured for secure communication with a first user application/accessory device using the first primary keyset KEY_SET_1_1 and optionally for secure communication with a first client/fitting device using the first secondary keyset KEY_SET_1_2. The hearing device is optionally configured for secure communication with a first server device using the first tertiary keyset KEY_SET_1_3. The hearing device may be configured for secure communication with a first primary wireless communication device using the first quaternary keyset KEY_SET_1_4. The hearing device may be configured for secure communication with a first secondary wireless communication device using the first quinary keyset KEY_SET_1_5.

The first keysets KEY_SET_1_1, KEY_SET_1_2, KEY_SET_1_3, KEY_SET_1_4, and KEY_SET_1_5 may be used for communication with devices/applications controlled by the manufacturer of the hearing device, e.g. in a first domain and/or a second domain.

The first keysets KEY_SET_1_1, KEY_SET_1_2, KEY_SET_1_3, KEY_SET_1_4, and KEY_SET_1_5 each comprises a plurality of keys and a key identifier indicative of one of the keys in the respective keyset.

The memory unit 6 may have a first secondary certificate 102 stored therein. The first secondary certificate 102 may comprise a first secondary signature $S\_1\_2$ being a digital signature.

The first secondary certificate 102 may comprise customer data such as a first secondary customer data indicative of the hearing device being configured to operate as a customer hearing device. In other words, first secondary customer data, such as a first secondary customer identifier CID_1_2 and/or a first secondary Bluetooth identifier BLE_ID_1_2 such as a first secondary customer identifier may be stored in the first secondary certificate 102.

The first secondary certificate 102 optionally comprises a first secondary hardware identifier HW_ID_1_2. The hearing device may be configured to compare the first primary hardware identifier HW_ID_1_2 with a first hardware identifier HW_ID_1 stored in the second part 7B of the memory unit 6, e.g. during startup or booting of the hearing device and/or as part of determining if the first secondary certificate 102 is valid.

The memory unit 6 has a second primary certificate 104 stored therein. The second primary certificate 104 comprises a second primary signature $S\_2\_1$ being a digital signature. The second primary signature $S\_2\_1$ may be verified or verifiable by a second primary certificate key C_KEY_2_1 optionally comprised in the second tertiary certificate 108 of the first part 7A of the memory unit 6.

The second primary certificate 104 comprises a second primary hearing device identifier HDID_2_1. The second primary hearing device identifier HDID_2_1 may uniquely identify the hearing device. The second primary certificate 104 comprises one or more keysets including a second primary keyset KEY_SET_2_1, a second secondary keyset KEY_SET_2_2, and a second tertiary keyset KEY_SET_2_3. The second primary certificate 104 optionally comprises customer data in the form of a second primary customer identifier CID_2_1. The hearing device may be configured to compare the second primary customer identifier CID_2_1 with one or more other customer identifiers, such as CID_1_2, CID_2_2 and CID_2_3, e.g. during startup or booting of the hearing device and/or as part of determining if the second primary certificate 104 is valid.

The hearing device is configured for secure communication with a second user application/accessory device using the second primary keyset KEY_SET_2_1 and optionally for secure communication with a second client/fitting device using the second secondary keyset KEY_SET_2_2. The hearing device is optionally configured for secure communication with a second server device using the second tertiary keyset KEY_SET_2_3. The second keysets KEY_SET_2_1, KEY_SET_2_2, KEY_SET_2_3 may be used for communication with devices/applications controlled by the third party/OEM customer, e.g. in a second domain.

The second keysets KEY_SET_1_1, KEY_SET_1_2, KEY_SET_1_3, KEY_SET_1_4, and KEY_SET_1_5 each comprises a plurality of keys and a key identifier indicative of one of the keys in the respective keyset.

The memory unit 6 may have a second secondary certificate 106 stored therein. In other words, the memory unit may comprise a second secondary certificate 106. The second secondary certificate may comprise a second secondary signature also denoted $S\_2\_2$ being a digital signature. The second secondary signature $S\_2\_2$ may be verified or verifiable by a second secondary certificate key C_KEY_2_2 optionally comprised in the second tertiary certificate 108 of the first part 7A of the memory unit 6.

The second secondary certificate 106 may comprise customer data indicative of the hearing device being configured to operate as a customer hearing device. In other words, second secondary customer data, such as a second secondary customer identifier CID_2_2 may be stored in the second secondary certificate 106.

The second secondary certificate 106 may comprise a second secondary hardware identifier HW_ID_2_2. The second secondary hardware identifier HW_ID_2_2 may be used for determining if the second secondary certificate 106 is valid, e.g. by comparing the second secondary hardware identifier HW_ID_2_2 with a first hardware identifier HW_ID_1, e.g. stored in the second part 7B of the memory unit 6. The second secondary hardware identifier may be used as second customer device identifier.

The memory unit 6 optionally has second model data stored therein. The second model data may be stored in the second secondary certificate 106. In other words, the second secondary certificate may function as a second model certificate In other words, the memory unit may comprise the second model data. The second model data optionally comprises a second model customer identifier. The second secondary customer identifier CID_2_2 of the second secondary certificate 106 may function as the second model customer identifier.

The second model data optionally comprises second model information data also denoted MID_2 indicative of one or more available models for the hearing device, e.g. such as indicative of one or more available models for the hearing device when the hearing device is configured as a customer hearing device. The second model information data MID_2 is optionally included in the second secondary certificate 106 and may be or comprise a second model identifier of the second secondary certificate. Thus, the second model certificate/second secondary certificate 106 may comprise the second model information data MID_2.

The memory unit 6 may have a second tertiary certificate 108 stored therein. In other words, the memory unit 6 may comprise a second tertiary certificate 108. The second tertiary certificate 108 may comprise a second tertiary signature $S\_2\_3$ being a digital signature. The second tertiary signature $S\_2\_3$ may be verified or verifiable by a second tertiary certificate key C_KEY_2_3 optionally comprised in the second part 7B of the memory unit 6.

The second tertiary certificate may comprise customer data indicative of the hearing device being configured to operate as a customer hearing device. In other words, second tertiary customer data, such as a second tertiary customer identifier CID_2_3 may be stored in the second tertiary certificate 108. The hearing device may be configured to compare the second tertiary customer identifier CID_2_3 with one or more other customer identifiers, such as CID_1_2, CID_2_1 and CID_2_2, e.g. during startup or booting of the hearing device and/or as part of determining if the second tertiary certificate 108 is valid and/or determining if the hearing device is a customer hearing device.

Figure 4:
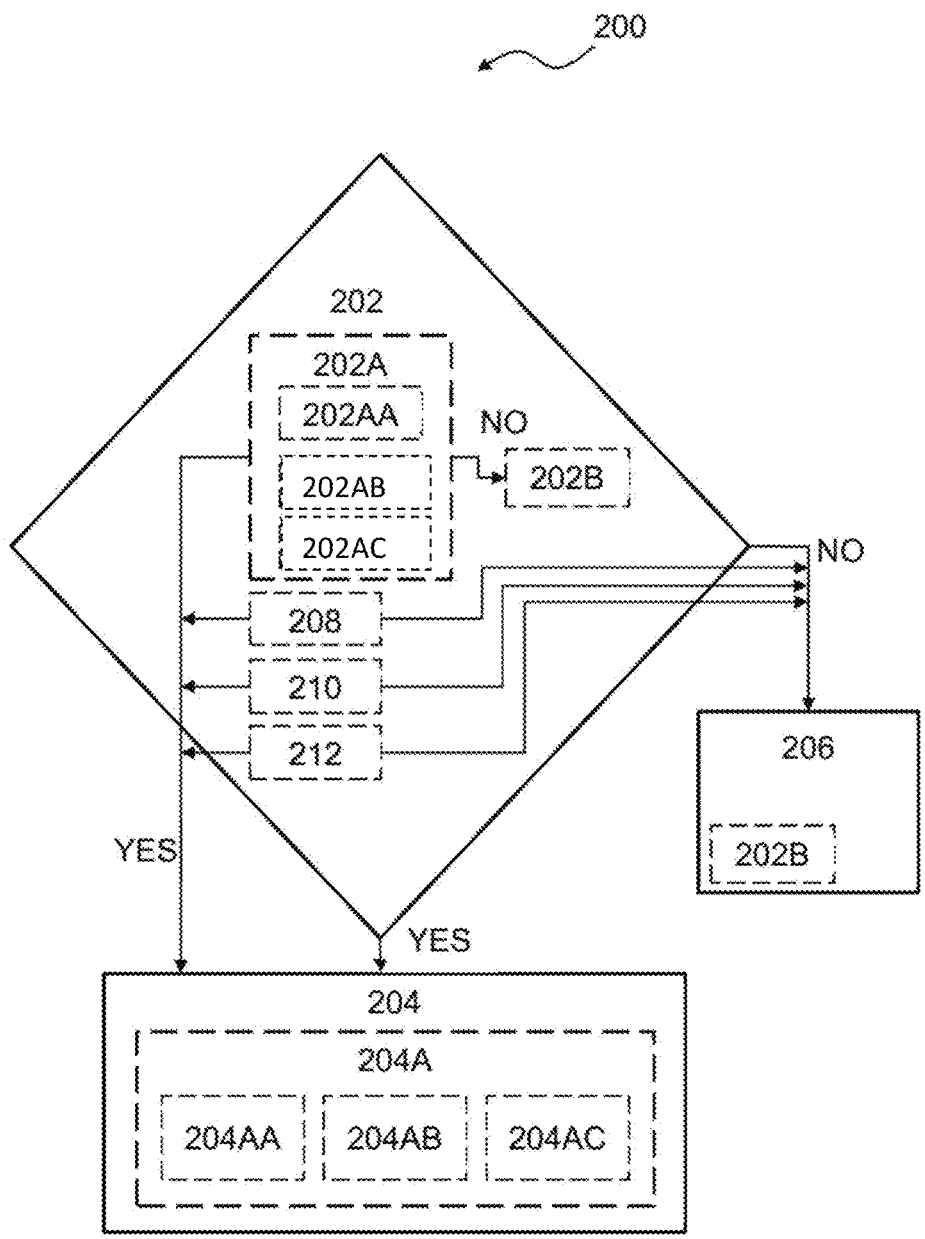
FIG. 4 is a flow chart of an exemplary method according to the present disclosure.

FIG. 4 is a flow chart of an exemplary method 200 according to the present disclosure. Method 200 is for operating a hearing device, such as a hearing disclosed herein, such as hearing device 2 of FIG. 2, the hearing device comprising a first primary certificate and a second primary certificate stored in a memory unit of the hearing device.

The method 200 comprises determining 202 if the hearing device is configured to operate as a customer hearing device based on customer data, e.g. customer data 110 stored in one or more certificates of the hearing device 2.

The method 200 comprises in accordance with a determination that the hearing device is configured to operate as a customer hearing device, operating 204 the hearing device according to the second primary certificate. The first primary certificate is optionally different from the second primary certificate. For example, a first primary keyset of the first primary certificate may be different from a second primary keyset of the second primary certificate and/or a first secondary keyset of the first primary certificate may be different from a second secondary keyset of the second primary certificate. A first tertiary keyset of the first primary certificate may be different from a second tertiary keyset of the second primary certificate.

In one or more exemplary methods, the method 200 comprises in accordance with a determination that the hearing device is not configured to operate as a customer hearing device, operating 206 the hearing device according to the first primary certificate and/or forgoing 202B to operate the hearing device according to the second primary certificate.

In one or more exemplary methods, the memory unit has stored therein a first secondary certificate comprising the customer data.

In one or more exemplary methods, the customer data comprises a BLE identifier and/or a customer identifier indicative of a customer. Determining if the hearing device is configured to operate as a customer hearing device based on the customer data may comprise determining if the hearing device is configured to operate as a customer hearing device based on one or more customer identifiers and/or the BLE identifier.

In one or more exemplary methods, determining 202 if the hearing device is configured to operate as a customer hearing device based on the customer data comprises determining 202A if the second primary certificate is valid. In one or more exemplary methods, in accordance with a determination that the second primary certificate is not valid, forgoing 202B to operate the hearing device according to the second primary certificate.

In one or more exemplary methods, determining 202A if the second primary certificate is valid comprises verifying 202AA a second primary signature of the second primary certificate and wherein the second primary certificate is not valid if the second primary signature of the second primary certificate is not verified.

In one or more exemplary methods, determining 202A if the second primary certificate is valid comprises comparing 202AB the first primary hearing device identifier and the second primary hearing device identifier, and wherein the second primary certificate is not valid if the first primary hearing device identifier is different from the second primary hearing device identifier.

In one or more exemplary methods, the second primary certificate comprises a second primary customer identifier. In one or more exemplary methods, determining 202A if the second primary certificate is valid comprises comparing 202AC the second primary customer identifier with one or more customer identifiers of the customer data, such as first secondary customer identifier of first secondary certificate.

In one or more exemplary methods, the second primary certificate is not valid if the second primary customer identifier is different from the customer identifier(s) of the customer data, e.g. if the second primary customer identifier is different from the first secondary customer identifier in the first secondary certificate.

In one or more exemplary methods, the second primary certificate comprises one or more second keysets including a second primary keyset comprising one or more second primary keys and a second primary key identifier, and wherein operating 204 the hearing device according to the second primary certificate comprises setting 204A up a connection to an accessory device, such as accessory device 14, based on a second primary key of the second primary keyset.

In one or more exemplary methods, setting up 204A a connection to an accessory device comprises obtaining 204AA a session key. In one or more exemplary methods, setting up 204A a connection to an accessory device comprises encrypting 204AB the session key with the second primary key of the second primary keyset to obtain an encrypted session key. In one or more exemplary methods, setting up 204A a connection to an accessory device comprises transmitting 204AC the encrypted session key to the accessory device.

In one or more exemplary methods, determining 202 if the hearing device is configured to operate as a customer hearing device based on the customer data comprises comparing 208 customer identifiers, e.g. CID_1_2, CID_2_1, CID_2_2, CID_2_3, stored in the memory unit, and wherein the hearing device is configured to operate as a customer hearing device if the customer identifiers are the same. Comparing 208 customer identifiers may be combined with verification of certificate signature(s) and/or comparing hardware identifiers and/or comparing hearing device identifiers to determine if the hearing device is configured to operate as a customer hearing device. Optionally, the hearing device is not configured to operate as a customer hearing device if the customer identifiers are different.

In one or more exemplary methods, determining 202 if the hearing device is configured to operate as a customer hearing device based on the customer data comprises verifying 210 second certificate(s), such as second primary certificate 104, second secondary certificate 106, and second tertiary certificate 108, stored in the memory unit. Verifying 210 second certificates may comprise verifying signatures of the second certificates, such as S_2_1, S_2_2, and S_2_3 of second primary certificate 104, second secondary certificate 106, and second tertiary certificate 108, respectively. The hearing device may be configured to operate as a customer hearing device if the second certificates are verified. Verifying 210 second certificates may be combined with verifying 208 certificate signature(s) and/or comparing hardware identifiers to determine if the hearing device is configured to operate as a customer hearing device. Optionally, the hearing device is not configured to operate as a customer hearing device if the second certificates are not verified.

In one or more exemplary methods, determining 202 if the hearing device is configured to operate as a customer hearing device based on the customer data comprises comparing 212 a hardware identifier, such as second secondary hardware identifier HW_ID_2_2, stored in the memory unit with a hardware identifier stored in the second part of memory unit, such as first hardware identifier HW_ID_1. The hearing device may be configured to operate as a customer hearing device if the hardware identifiers are the same. Comparing 212 hardware identifiers may be combined with verification of certificate signature(s) and/or comparing customer identifiers to determine if the hearing device is configured to operate as a customer hearing device. Optionally, the hearing device is not configured to operate as a customer hearing device if the hardware identifiers are different.

Figure 5:
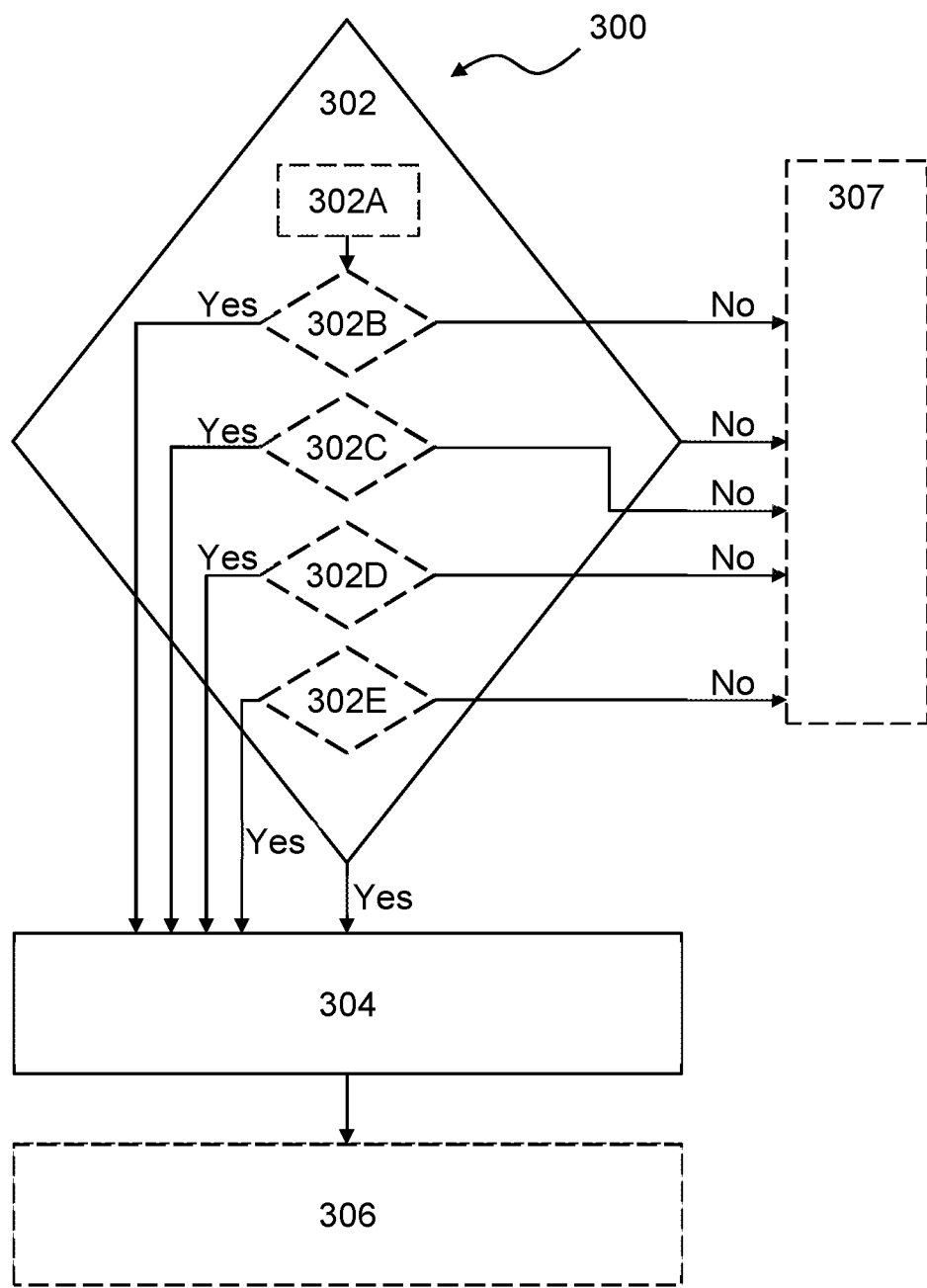
FIG. 5 is a flow chart of an exemplary method according to the present disclosure.

FIG. 5 is a flow chart of an exemplary method 300 according to the present disclosure. The method 300 is for operating a hearing device, such as a hearing disclosed herein, such as hearing device 2A of FIG. 2. The hearing device comprises a memory unit having stored therein a first primary customer device identifier, such as HW_ID_1_2. In one or more exemplary methods 300, the memory unit has stored therein a first model certificate, such as first secondary certificate 102, comprising a first customer identifier, such as CID_1_2.

In one or more exemplary methods, the memory unit has stored therein second model data comprising a second model customer identifier, such as CID_2_2, and second model information data MID_2 indicative of one or more available models for the hearing device.

The method 300 comprises verifying 302 the second model data, e.g. by one more of checking if a current model identifier satisfies a model criterion, if CID_2_2=CID_1_2, and by verifying second secondary signature S_2_2.

The method 300 comprises operating 304 the hearing device according to the second model information data, e.g. upon successful verification of the second model data.

In one or more exemplary methods, verifying 302 the second model data comprises obtaining 302A a current model identifier and to compare the current model identifier with the second model information data.

In one or more exemplary methods, the verification of the second model data is successful when the current model identifier satisfies a model criterion based on the second model information data. In other words, verifying 302 the second model data may comprise determining 302B if current model identifier satisfying a model criterion based on the second model information data. The current model identifier may satisfy the model criterion if the current model identifies corresponds to a model identifier of the second model data.

In one or more exemplary methods, the memory unit has stored therein a second model certificate, e.g. certificate 106, comprising the second model data and a second secondary signature.

In one or more exemplary methods, verifying 302 the second model data comprises verifying 302C the second secondary signature, e.g. using second secondary certificate key, e.g. stored in second tertiary certificate 108.

In one or more exemplary methods, the verification of the second model data is successful when the verification of the second secondary signature, e.g. S_2_2 is successful.

In one or more exemplary methods, the second model data comprises a second customer device identifier, e.g. HW_ID_2_2.

In one or more exemplary methods, verifying 302 the second model data comprises determining 302D if the second customer device identifier corresponds to the first primary customer device identifier, e.g. if HW_ID_1_2=HW_ID_2_2.

In one or more exemplary methods, the verification of the second model data is successful when the second customer device identifier corresponds to the first primary customer device identifier.

In one or more exemplary methods, the first primary customer device identifier is based on a hardware identifier of the hearing device.

In one or more exemplary methods, the method 300 comprises operating 306 the hearing device as a customer hearing device based on the first customer identifier.

In one or more exemplary methods, the memory unit has stored therein a first key certificate comprising a first model key or having the first model key, e.g. C_KEY_1_2, stored in a locked part of the memory unit.

In one or more exemplary methods, the memory unit has stored therein a second key certificate comprising a second model key, e.g. second tertiary certificate 108 comprising C_KEY_2_2. In one or more exemplary methods, the second key certificate comprises a second tertiary customer identifier, such as CID_2_3.

In one or more exemplary methods, verifying 302 the second model data comprises determining 302E if the second model customer identifier, CID_2_2 corresponds to the first customer identifier, e.g. if CID_2_2=CID_1_2, and/or to the second tertiary customer identifier, e.g. if CID_2_2=CID_2_3.

In one or more exemplary methods, the verification of the second model data is successful or at least partly successful when the second model customer identifier corresponds to the first customer identifier.

In one or more exemplary methods, the verification of the second model data is successful or at least partly successful when the second model customer identifier corresponds to the second tertiary customer identifier.

In one or more exemplary methods, the method 300 comprises forgoing 307 operating the hearing device according to the second model information data, when the verification of the second model data fails or is not successful. Forgoing operating the hearing device according to the second model information data may comprising aborting normal hearing device operation, e.g. compensating for hearing loss of the user and/or moving to a service or repair state/mode.

Figure 6:
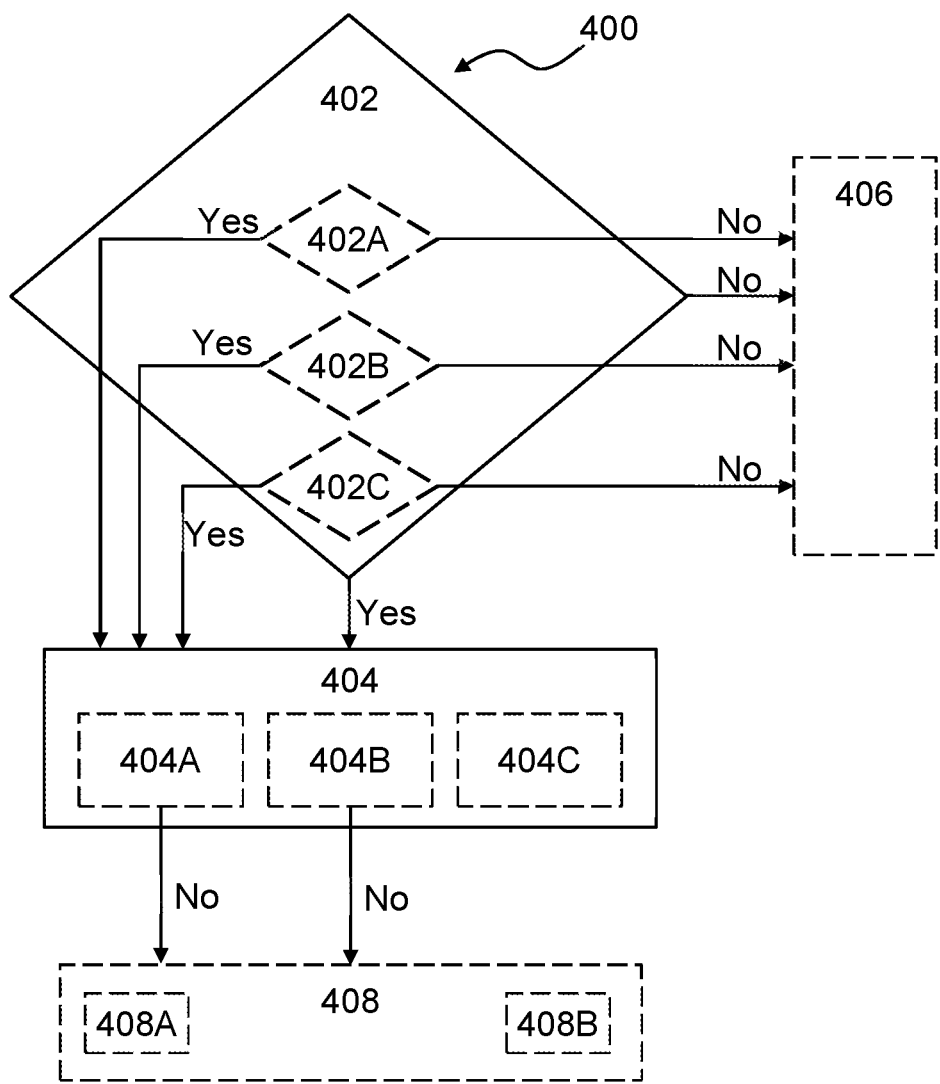
FIG. 6 is a flow chart of an exemplary method according to the present disclosure.

FIG. 6 is a flow chart of an exemplary method 400 according to the present disclosure. The method 400 is for operating a hearing device, such as a hearing disclosed herein, such as hearing device 2B of FIG. 2. The hearing device comprises a processing unit configured to compensate for hearing loss of a user of the hearing device; an interface; and a memory unit. The memory unit has stored therein a first primary certificate comprising a first primary hearing device identifier. Optionally, the memory unit has stored therein a second primary certificate comprising a second primary hearing device identifier and/or second key data for third-party control of the hearing device. The second key data optionally comprises one or more second key sets including a second primary key set.

The method 400 comprises verifying 402 the second primary certificate, e.g. second primary certificate 104 and optionally based on the second primary signature and/or the second primary hearing device identifier.

The method 400 comprises in accordance with successfully verifying the second primary certificate, communicating 404 with a third-party entity based on the second key data, such as based on one or more of second primary keyset, second secondary keyset, and second tertiary keyset. The method optionally comprises aborting normal hearing device operation, e.g. entering a service mode or repair mode and/or forgoing compensating for hearing loss of the user and/or switching the hearing device off, in accordance with failure in verifying the second primary certificate.

In one or more exemplary methods, the second primary keyset is a tablet/fitting/dispenser device keyset configured to secure communication with a tablet/fitting/dispenser being the third-party entity. Thus, a third party may implement and control its own fitting architecture separate from the manufacturer of the hearing device.

In one or more exemplary methods, the one or more second key sets include a second secondary keyset. In one or more exemplary methods, the second secondary keyset is a third-party server keyset configured to secure communication with a third-party server being the third-party entity. In other words, the second secondary keyset may be configured to secure communication with a third-party server, also denoted second server device, being the third-party entity.

In one or more exemplary methods, the second primary keyset comprises a second primary key identifier and/or one or more keys.

In one or more exemplary methods, verifying 402 the second primary certificate comprises verifying 402A the second primary hearing device identifier, e.g. by comparing the second primary hearing device identifier with the first primary hearing device identifier, e.g. of the first primary certificate.

In one or more exemplary methods, the memory unit has stored therein a second primary certificate key, e.g. comprised in second secondary certificate or second tertiary certificate. In one or more exemplary methods, verifying 402 the second primary certificate comprises verifying 402B a second primary signature of the second primary certificate based on the second primary certificate key.

In one or more exemplary methods, verifying 402 the second primary certificate comprises verifying 402C a second primary customer identifier of the second primary certificate, e.g. by comparing the second primary customer identifier with one or more other customer device identifiers stored in the memory unit, e.g. CID_2_1, CID_2_2, CID_2_3.

The method 400 optionally comprises aborting normal hearing device operation 406, e.g. entering a service mode or repair mode and/or forgoing compensating for hearing loss of the user and/or switching the hearing device off, in accordance with failure in verifying 402 the second primary certificate, such as in accordance with failure in verifying one or more of second primary signature, second hearing device identifier, and second primary customer identifier.

In one or more exemplary methods, communicating 404 with the third-party entity based on the second key data comprises verifying 404A communication data based on the second primary keyset.

In one or more exemplary methods, communicating 404 with the third-party entity based on the second key data comprises verifying 404B communication data based on the second secondary keyset.

In one or more exemplary methods, communicating 404 with the third-party entity based on the second key data comprises applying 404C a third-party operating system in the processing unit.

The method 400 optionally comprises forgoing 408 communicating with the third-party entity, in accordance with failure in verifying communication data, e.g. comprising forgoing 408A communicating with the third-party entity in accordance with failure in verifying communication data based on the second primary keyset and/or forgoing 408B communicating with the third-party entity in accordance with failure in verifying communication data based on the second secondary keyset.

Forgoing 408 communicating with the third-party entity may comprise entering a service mode or repair mode and/or forgoing compensating for hearing loss of the user and/or switching the hearing device off.

Disclosed are hearing devices, and methods according to any of the following items.

Item 1. A hearing device comprising
  a processing unit configured to compensate for hearing loss of a user of the hearing device;
  an interface; and
  a memory unit,
wherein the memory unit has stored therein:
  a first primary certificate comprising a first primary hearing device identifier;
  a second primary certificate comprising a second primary hearing device identifier; and
  customer data indicative of the hearing device being configured to operate as a customer hearing device,
wherein the processing unit is configured to:
  determine if the hearing device is configured to operate as a customer hearing device based on the customer data; and
  in accordance with a determination that the hearing device is configured to operate as a customer hearing device, operate the hearing device according to the second primary certificate.

Item 2. Hearing device according to item 1, wherein the first primary certificate is different from the second primary certificate, Item 3. Hearing device according to any of items 1-2, wherein the processing unit is configured to:
  in accordance with a determination that the hearing device is not configured to operate as a customer hearing device, operate the hearing device according to the first primary certificate.

Item 4. Hearing device according to any of items 1-3, wherein the memory unit has stored therein a first secondary certificate comprising first secondary customer data of the customer data.

Item 5. Hearing device according to any of items 1-4, wherein the customer data comprises a BLE identifier and/or a customer identifier indicative of a customer.

Item 6. Hearing device according to any of items 1-5, wherein to determine if the hearing device is configured to operate as a customer hearing device based on the customer data comprises determining if the second primary certificate is valid, and wherein the processing unit is configured to, in accordance with a determination that the second primary certificate is not valid, forgo to operate the hearing device according to the second primary certificate.

Item 7. Hearing device according to item 6, wherein determining if the second primary certificate is valid comprises verifying a second primary signature of the second primary certificate and wherein the second primary certificate is not valid if the second primary signature of the second primary certificate is not verified.

Item 8. Hearing device according to any of items 6-7, wherein determining if the second primary certificate is valid comprises comparing the first primary hearing device identifier and the second primary hearing device identifier, and wherein the second primary certificate is not valid if the first primary hearing device identifier is different from the second primary hearing device identifier.

Item 9. Hearing device according to any of items 6-8 as dependent on item 5, wherein the second primary certificate comprises a second primary customer identifier, and wherein determining if the second primary certificate is valid comprises comparing the second primary customer identifier with a customer identifier of the customer data, and wherein the second primary certificate is not valid if the second primary customer identifier is different from the customer identifier of the customer data.

Item 10. Hearing device according to any of items 1-9, wherein the second primary certificate comprises one or more second keysets including a second primary keyset comprising one or more second primary keys and a second primary key identifier, and wherein to operate the hearing device according to the second primary certificate comprises setting up a connection to an accessory device based on a second primary key of the second primary keyset.

Item 11. Hearing device according to item 10, wherein setting up a connection to an accessory device comprises obtaining a session key, encrypting the session key with the second primary key of the second primary keyset to obtain an encrypted session key, and transmitting the encrypted session key to the accessory device.

Item 12. Method for operating a hearing device comprising a processing unit configured to compensate for hearing loss of a user of the hearing device; an interface; and a memory unit, wherein the memory unit has stored therein a first primary certificate comprising a first primary hearing device identifier; a second primary certificate comprising a second primary hearing device identifier; and customer data indicative of the hearing device being configured to operate as a customer hearing device, the method comprising:
  determining if the hearing device is configured to operate as a customer hearing device based on customer data; and
  in accordance with a determination that the hearing device is configured to operate as a customer hearing device, operating the hearing device according to the second primary certificate.

Item 13. Method according to item 12, wherein the first primary certificate is different from the second primary certificate.

Item 14. Method according to any of items 12-13, wherein the method comprises:
  in accordance with a determination that the hearing device is not configured to operate as a customer hearing device, operating the hearing device according to the first primary certificate.

Item 15. Method according to any of items 12-14, wherein the memory unit has stored therein a first secondary certificate comprising first secondary customer data.

Item 16. Method according to any of items 12-15, wherein the customer data comprises a BLE identifier and/or a customer identifier indicative of a customer.

Item 17. Method according to any of items 12-16, wherein determining if the hearing device is configured to operate as a customer hearing device based on the customer data comprises determining if the second primary certificate is valid, and wherein in accordance with a determination that the second primary certificate is not valid, forgoing to operate the hearing device according to the second primary certificate.

Item 18. Method according to item 17, wherein determining if the second primary certificate is valid comprises verifying a second primary signature of the second primary certificate and wherein the second primary certificate is not valid if the second primary signature of the second primary certificate is not verified.

Item 19. Method according to any of items 17-18, wherein determining if the second primary certificate is valid comprises comparing the first primary hearing device identifier and the second primary hearing device identifier, and wherein the second primary certificate is not valid if the first primary hearing device identifier is different from the second primary hearing device identifier.

Item 20. Method according to any of items 17-19 as dependent on item 16, wherein the second primary certificate comprises a second primary customer identifier, and wherein determining if the second primary certificate is valid comprises comparing the second primary customer identifier with a customer identifier of the customer data, and wherein the second primary certificate is not valid if the second primary customer identifier is different from the customer identifier of the customer data.

Item 21. Method according to any of items 12-20, wherein the second primary certificate comprises one or more second keysets including a second primary keyset comprising one or more second primary keys and a second primary key identifier, and wherein operating the hearing device according to the second primary certificate comprises setting up a connection to an accessory device based on a second primary key of the second primary keyset.

Item 22. Method according to item 21, wherein setting up a connection to an accessory device comprises obtaining a session key, encrypting the session key with the second primary key of the second primary keyset to obtain an encrypted session key, and transmitting the encrypted session key to the accessory device.

The use of the terms "first", "second", "third" and "fourth", "primary", "secondary", "tertiary", quaternary, quinary, etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-6 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium or memory unit, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 2, 2A, 2B hearing device
4 processing unit of hearing device
6 memory unit of hearing device
7A first part of memory unit
7B second part of memory unit
8 interface of hearing device
10 transceiver, radio transceiver
12 antenna
13 wireless communication
14 accessory device
16 first client device, first fitting device
18 second client device, second fitting device
20 first server device, manufacturer server device
22 second server device, third-party server device
24 first microphone
26 second microphone
28 receiver
30 processing unit of accessory device
32 memory unit of accessory device
34 interface of accessory device
36 first user application installed and operating on the accessory device
38 second user application installed and operating on the accessory device
100 first primary certificate
102 first secondary certificate
104 second primary certificate
106 second secondary certificate
108 second tertiary certificate
110 customer data
200 method for operating a hearing device
202 determining if the hearing device is configured to operate as a customer hearing device based on customer data
202A determining if the second primary certificate is valid
202AA verifying a signature of the second primary certificate
S202AB comparing the first primary hearing device identifier and the second primary hearing device identifier
202AC comparing the second primary customer identifier with customer identifier of the customer data
202B forgoing to operate the hearing device according to the second primary certificate.
204 in accordance with a determination that the hearing device is configured to operate as a customer hearing device, operating the hearing device according to the second primary certificate
204A setting up a connection to an accessory device based on a second key of the second key set
204AA obtaining a session key
204AB encrypting the session key with the second key of the second key set to obtain an encrypted session key
204AC transmitting the encrypted session key to the accessory device
206 operating the hearing device according to the first primary certificate and/or abort normal hearing device operation
208 comparing customer identifiers stored in the memory unit
210 verifying second certificate(s) stored in the memory unit
212 comparing hardware identifier(s) in second certificate(s) with hardware identifiers of second part of the memory unit and/or of hardware identifier(s) in first certificate(s)
300 method for operating a hearing device
302 verifying second model data
302A obtaining a current model identifier and to compare the current model identifier with the second model information data
302B determining if current model identifier satisfying a model criterion based on the second model information data
302C verifying the second secondary signature
302D determining if the second customer device identifier corresponds to the first primary customer device identifier
302E determining if the second model customer identifier corresponds to the first customer identifier and/or the second tertiary customer identifier
304 operating the hearing device according to the second model information data
306 operating the hearing device as a customer hearing device based on the first customer identifier
307 forgoing operating the hearing device according to the second model information data
400 method for operating a hearing device
402 verifying the second primary certificate
402A verifying the second hearing device identifier
402B verifying a second primary signature of the second primary certificate
402C verifying second primary customer identifier
404 in accordance with successfully verifying the second primary certificate, communicating with a third-party entity based on the second key data
404A verifying communication data based on the second primary keyset 404B verifying communication data based on the second secondary keyset
404C applying a third-party operating system in the processing unit
406 aborting normal hearing device operation
408 forgoing communicating with the third-party entity in accordance with failure in verifying communication data
408A forgoing communicating with the third-party entity in accordance with failure in verifying communication data based on the second primary keyset
408B forgoing communicating with the third-party entity in accordance with failure in verifying communication data based on the second secondary keyset
CID_1_2 first secondary customer identifier
CID_2_1 second primary customer identifier
CID_2_2 second secondary customer identifier
CID_2_3 second tertiary customer identifier
C_KEY_1_1 first primary certificate key
C_KEY_1_2 first secondary certificate key
C_KEY_2_1 second primary certificate key
C_KEY_2_2 second secondary certificate key
C_KEY_2_3 second tertiary certificate key
HDID_1_1 first primary hearing device identifier
HDID_2_1 second primary hearing device identifier
HW_ID_1 first hardware identifier
HW_ID_1_1 first primary hardware identifier
HW_ID_1_2 first secondary hardware identifier
HW_ID_2 second hardware identifier
HW_ID_2_2 second secondary hardware identifier
KEY_SET_1_1 first primary keyset
KEY_SET_1_2 first secondary keyset
KEY_SET_1_3 first tertiary keyset
KEY_SET_1_4 first quaternary keyset
KEY_SET_1_5 first quinary keyset
KEY_SET_2_1 second primary keyset
KEY_SET_2_2 second secondary keyset
KEY_SET_2_3 second tertiary keyset
MID_2 second model information data
S_1_1 first primary signature
S_1_2 first secondary signature
S_2_1 second primary signature
S_2_2 second secondary signature
S_2_3 second tertiary signature

The invention claimed is:

1. A hearing device comprising:
a processing unit configured to compensate for hearing loss of a user of the hearing device, wherein the processing unit comprises hardware;
an interface; and
a memory unit, wherein the memory unit has stored therein: a first primary certificate comprising a first primary hearing device identifier, a second primary certificate comprising a second primary hearing device identifier, and customer data indicative of the hearing device being a customer hearing device;
wherein the processing unit is configured to:
determine if the hearing device is configured to operate as the customer hearing device based on the customer data; and
in accordance with a determination that the hearing device is configured to operate as the customer hearing device, operate the hearing device according to the second primary certificate.

2. The hearing device according to claim 1, wherein the first primary certificate is different from the second primary certificate.

3. The hearing device according to claim 1, wherein the processing unit is configured to:
in accordance with a determination that the hearing device is not configured to operate as a customer hearing device, operate the hearing device according to the first primary certificate.

4. The hearing device according to claim 1, wherein the memory unit has stored therein a first secondary certificate comprising first secondary customer data.

5. The hearing device according to claim 1, wherein the customer data comprises a BLE identifier and/or a customer identifier indicative of a customer, and wherein the processing unit of the hearing device is configured to use the BLE identifier and/or the customer identifier to determine whether to operate the hearing device according to the first primary certificate or the second primary certificate.

6. The hearing device according to claim 1, wherein the processing unit is configured to determine if the second primary certificate is valid, and wherein the processing unit is configured to, in accordance with a determination that the second primary certificate is not valid, forgo to operate the hearing device according to the second primary certificate.

7. The hearing device according to claim 6, wherein the processing unit is configured to determine if the second primary certificate is valid by verifying a second primary signature of the second primary certificate.

8. The hearing device according to claim 7, wherein the processing unit is configured to determine the second primary certificate as invalid if the second primary signature of the second primary certificate is not verified.

9. The hearing device according to claim 6, wherein the processing unit is configured to determine if the second primary certificate is valid by comparing the first primary hearing device identifier and the second primary hearing device identifier.

10. The hearing device according to claim 9, wherein the processing unit is configured to determine the second primary certificate as invalid if the first primary hearing device identifier is different from the second primary hearing device identifier.

11. The hearing device according to claim 6, wherein the customer data comprises a first OEM customer identifier, wherein the second primary certificate comprises a second OEM customer identifier, and wherein the processing unit is configured to determine if the second primary certificate is valid by comparing the second OEM customer identifier with the first OEM customer identifier of the customer data.

12. The hearing device according to claim 11, wherein the processing unit is configured to determine the second primary certificate as invalid if the second OEM customer identifier is different from the first OEM customer identifier of the customer data.

13. The hearing device according to claim 1, wherein the second primary certificate comprises a keyset having a primary key, and wherein the processing unit is configured to operate the hearing device according to the second primary certificate by operating the hearing device to set up a connection with an accessory device based on the primary key of the keyset.

14. The hearing device according to claim 13, wherein the hearing device is configured to set up the connection with the accessory device by obtaining a session key, encrypting the session key with the primary key of the keyset to obtain an encrypted session key, and transmitting the encrypted session key to the accessory device.

15. A method performed by a processing unit of a hearing device to operate the hearing device, the processing unit configured to compensate for hearing loss of a user of the hearing device, the hearing device comprising an interface and a memory unit, wherein the memory unit has stored therein a first primary certificate comprising a first primary hearing device identifier, a second primary certificate comprising a second primary hearing device identifier, and customer data indicative of the hearing device being a customer hearing device, the method comprising:

determining if the hearing device is configured to operate as the customer hearing device based on the customer data; and in accordance with a determination that the hearing device is configured to operate as the customer hearing device, operating the hearing device according to the second primary certificate.

16. The method according to claim 15, wherein the first primary certificate is different from the second primary certificate.

17. The method according to claim 15, further comprising:

in accordance with a determination that the hearing device is not configured to operate as the customer hearing device, operating the hearing device according to the first primary certificate.

18. The method according to claim 15, wherein the memory unit has stored therein a first secondary certificate comprising first secondary customer data.

19. The hearing device according to claim 1, wherein the first primary certificate comprising the first primary hearing device identifier, and the second primary certificate comprising the second primary hearing device identifier, are both in the memory unit concurrently at least for a period of time.

20. The hearing device according to claim 1, wherein the customer data is indicative of the hearing device being associated with an original-equipment-manufacturer (OEM) customer.

21. The hearing device according to claim 1, wherein the hearing device is configured to operate based on a sound processing parameter, and wherein the customer data is different from the sound processing parameter.

* * * * *